US012567545B2

(12) United States Patent
Yang

(10) Patent No.: US 12,567,545 B2
(45) Date of Patent: Mar. 3, 2026

(54) MOTOR ASSEMBLY AND CIRCUIT BREAKER COMPRISING SAME

(71) Applicant: LS ELECTRIC CO., LTD., Anyang-si (KR)

(72) Inventor: Hongik Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 389 days.

(21) Appl. No.: 18/037,917

(22) PCT Filed: Oct. 26, 2021

(86) PCT No.: PCT/KR2021/015124
§ 371 (c)(1),
(2) Date: May 19, 2023

(87) PCT Pub. No.: WO2022/108156
PCT Pub. Date: May 27, 2022

(65) Prior Publication Data
US 2024/0013986 A1 Jan. 11, 2024

(30) Foreign Application Priority Data
Nov. 20, 2020 (KR) ........................ 10-2020-0157056

(51) Int. Cl.
*H02K 7/00* (2006.01)
*H01H 3/26* (2006.01)
*H02K 7/116* (2006.01)

(52) U.S. Cl.
CPC .............. *H01H 3/26* (2013.01); *H02K 7/003* (2013.01); *H02K 7/116* (2013.01)

(58) Field of Classification Search
CPC ................................. H02K 7/003; H02K 1/14
(Continued)

(56) References Cited

U.S. PATENT DOCUMENTS

| | | | |
|---|---|---|---|
| 6,373,358 B1 | 4/2002 | Davies et al. | |
| 2008/0159667 A1* | 7/2008 | Michioka | F16C 31/02 384/7 |
| 2018/0342857 A1 | 11/2018 | Weeks et al. | |

FOREIGN PATENT DOCUMENTS

| | | | | |
|---|---|---|---|---|
| JP | H08182249 A | * | 7/1996 | |
| JP | 2002206621 A | | 7/2002 | |

(Continued)

OTHER PUBLICATIONS

International Search Report for corresponding International Application No. PCT/KR2021/015124, dated Feb. 15, 2022. (2 pages.).
(Continued)

*Primary Examiner* — Jose A Gonzalez Quinones
(74) *Attorney, Agent, or Firm* — K&L Gates LLP

(57) ABSTRACT

Disclosed are a motor assembly and a circuit breaker comprising same. According to an embodiment of the present invention, the motor assembly includes a cover member and a bush member formed of an insulating material. The bush member and the cover member physically and electrically space apart a motor and a gear member from each other. Here, the gear member is formed of a steel material and therefore maintains durability. Accordingly, the motor assembly can have improved insulation performance while maintaining operation reliability and rigidity.

15 Claims, 24 Drawing Sheets

(58) Field of Classification Search
USPC ...................................... 310/48, 83, 40 MM
See application file for complete search history.

(56)                   References Cited

FOREIGN PATENT DOCUMENTS

| | | | |
|---|---|---|---|
| JP | 2004100931 | A | 4/2004 |
| JP | 2012193808 | A * | 10/2012 |
| KR | 100655803 | B1 | 12/2006 |
| KR | 100727645 | B1 | 6/2007 |
| KR | 100737045 | B1 | 7/2007 |
| KR | 101067740 | B1 | 9/2011 |
| KR | 200469073 | Y1 | 9/2013 |

OTHER PUBLICATIONS

Office Action issued in corresponding KR Patent Application No. 10-2020-0157056; dated Aug. 22, 2022. (5 pages.).
Decision of Rejection issued in corresponding KR Patent Application No. 10-2020-0157056, dated Jan. 8, 2023. (4 pages.).
Written Opinion for corresponding International Application No. PCT/KR2021/015124, dated Feb. 15, 2022. (4 pages.).

* cited by examiner (a)

(b)

(a)

(b)

(a)

(b)

(a)

(b)

(a)

(b)

500

(a)

(b)

(a)

(b)

MOTOR ASSEMBLY AND CIRCUIT BREAKER COMPRISING SAME

CROSS-REFERENCE TO RELATED APPLICATIONS

This application is the National Stage filing under 35 U.S.C. 371 of International Application No. PCT/KR2021/015124, filed on Oct. 26, 2021, which claims the benefit of earlier filing date and right of priority to Korean Application No. 10-2020-0157056, filed Nov. 20, 2020, the contents of which are all hereby incorporated by reference herein in their entirety.

FIELD

The present disclosure relates to a motor assembly and a circuit breaker having the same, and more particularly, to a motor assembly having a structure capable of enhancing insulation performance and minimizing design change, and a circuit breaker having the same.

BACKGROUND

A circuit breaker is a device that is provided to break a circuit when a fault current such as overcurrent, short circuit, or ground fault occurs on an extra-high voltage or high-voltage distribution line.

A circuit breaker may be switched to a closed or trip state. In the closed state, the circuit breaker is electrically connected to an external power source or load. In the trip state, the circuit breaker is electrically disconnected from the external power source or load.

The circuit breaker is equipped with a motor. When current is applied to the circuit breaker, the motor is operated to rotate a gear connected to the motor and a camshaft connected to the gear. By the rotation of the camshaft, a spring of a mechanism is compressed and the circuit breaker is electrically connected to the external power source or load.

As described above, an extra-high voltage or high voltage current is applied to the circuit breaker. Therefore, maintaining insulation performance between components of the circuit breaker is an important factor.

In particular, maintaining insulation performance between the motor to which current is applied and the gear coupled to the motor is essential for a stable operation of the circuit breaker.

Referring to FIG. 1, a motor assembly 1000 according to the related art includes a motor 1100, a motor gear 1200 connected to the motor 1100, and a gear unit including a plurality of gears 1300 engaged with the motor gear 1200. When the motor 1100 is operated, the motor gear 1200 and the gear unit 1300 engaged therewith may be rotated.

At this time, the motor gear 1200 and the gear unit 1300 must have sufficient rigidity because they are rotated in the engaged state. To this end, the motor gear 1200 and the gear unit 1300 are generally formed of a steel material.

However, rigidity may be guaranteed as the motor gear 1200 and gear unit 1300 are formed of steel, which, however, causes an unexpected electric connection of the motor 1100 to the motor gear 1200 and the gear unit 1300.

Korean Registration Application No. 10-10737045 discloses a power circuit breaker. Specifically, a power circuit breaker having a structure capable of improving insulation performance by including a molded insulation casing providing a structural support part, and an electrical insulation part for an electrode mechanism mounted in a cavity is disclosed.

However, this type of power circuit breaker does not provide a way to prevent an electrical connection between the motor and the gear unit. That is, the prior art literature only suggests a method for insulating outside and inside of the circuit breaker, but does not disclose a structure for insulating a motor that supplies power for operation.

Korean Registration Utility Model No. 20-0469073 discloses a vacuum circuit breaker having an insulation reinforcement part. Specifically, a vacuum circuit breaker having a structure capable of improving insulation performance by including an insulation reinforcement part formed of a material having a higher insulation property than a material of an insulation part is disclosed.

However, this type of vacuum circuit breaker does not provide a way to prevent an electrical connection between the motor and the gear unit. That is, the prior art literature only suggests a method for insulating outside and inside of the circuit breaker, but does not disclose a structure for insulating a motor that supplies power for operation.

PRIOR ART DOCUMENT

Patent Document (Patent Document 1) Korean Registration Application No. 10-0737045 (Jul. 9, 2007)
(Patent Document 2) Korean Registration Utility Model No. 20-0469073 (Sep. 23, 2013)

SUMMARY

The present disclosure describes a motor assembly having a structure capable of solving those problems and other drawbacks, and a circuit breaker including the same.

One aspect of the present disclosure is to provide a motor assembly having a structure capable of securing insulation performance, and a circuit breaker including the same.

Another aspect of the present disclosure is to provide a motor assembly having a structure capable of improving operational reliability of a mechanism according to an application of control power, and a circuit breaker including the same.

Still another aspect of the present disclosure is to provide a motor assembly having a structure capable of ensuring insulation performance and operational reliability even when an impact is applied from outside, and a circuit breaker including the same.

Still another aspect of the present disclosure is to provide a motor assembly having a structure capable of minimizing an increase in manufacturing time and costs, and a circuit breaker including the same.

In order to achieve those aspects and other advantages of the present disclosure, there is provided a motor assembly that may include a motor electrically connected to an external control power source, a shaft connected to the motor to be rotated together with the motor, a bush member through which the shaft is coupled, and a gear member through which the bush member is coupled, and with which an external gear assembly is engaged, and the bush member may be formed of an insulating material and located between the shaft and the gear member in a radial direction.

The bush member of the motor assembly may include a base formed in a plate shape having a predetermined thickness and supporting the gear member, and a boss part continuously formed with the base, extending in one direction, and coupled through an inside of the gear member.

A diameter of a cross-section of the base of the motor assembly may be larger than an outer diameter of a cross-section of the gear member.

The gear member of the motor assembly may include an annular part extending in the one direction and having a hollow therein, and a tooth part extending along an outer circumference of the annular part, and including a plurality of concave portions and convex portions. The base may include a seating surface supporting the gear member, and a bush stepped portion extending along an outer circumference of the seating surface and protruding from the seating surface to surround the tooth part from a radially outside of the tooth part.

The gear member may have a hollow part formed through an inside thereof in the one direction, and the hollow part may have a stepped part protruding radially inward from an inner circumferential surface of the gear member to partially surround the hollow part.

The stepped part of the motor assembly may extend toward the base from one side opposite to the base, and an end portion of the stepped part facing the base may be spaced apart from the base. The hollow part may include a first hollow portion having a portion surrounded by the stepped part, and a second hollow portion communicating with the first hollow portion, and located between the end portion of the stepped part and the base to have a larger space than the first hollow portion.

The stepped part of the motor assembly may be provided in plurality facing each other, and surfaces of the plurality of stepped parts facing each other may be formed flat. The boss part of the bush member may include a plurality of flat portions forming a portion of an outer circumference of the boss part, disposed to face the stepped parts, and spaced apart to face each other, and a plurality of curved portions continuous with the plurality of flat portions, disposed to face an inner circumference surrounding a remaining portion of the first hollow portion and an inner circumference surrounding the second hollow portion, and spaced apart to face each other.

The shaft of the motor assembly may include a shaft part extending in the one direction and coupled through the bush member. The shaft part may include a curved portion defining a portion of an outer circumference thereof and rounded radially outward, and a flat portion defining a remaining portion of the outer circumference, continuous with the curved portion, and formed flat. The bush member may include a boss hollow portion formed through an inside thereof in the one direction such that the shaft part is coupled therethrough.

An inner circumference of the bush member surrounding the boss hollow portion may have one portion facing the curved portion and rounded to be radially outwardly convex, and another portion facing the flat portion and formed flat.

The motor assembly may further include a fastening member coupled to an end portion of the shaft in one direction in which the shaft extends, and a gear member through which the shaft is coupled, and which is located between the fastening member and the gear member to cover the gear member. The cover member may be formed of an insulating material.

The shaft of the motor assembly may include a shaft part extending in the one direction, coupled through the bush member, and partially inserted into the cover member, and a head part continuous with the shaft part, and inserted through the cover member such that one end portion thereof is coupled to the fastening member.

The shaft part of the motor assembly may include a curved portion defining a portion of an outer circumference thereof and rounded radially outward, and a flat portion defining a remaining portion of the outer circumference, continuous with the curved portion, and formed flat. The cover member may include a first cover hollow portion formed through an inside thereof such that the head part is inserted therethrough, and a second cover hollow portion which communicates with the first cover hollow portion and into which the shaft part is partially inserted. The second cover hollow portion may be formed such that a diameter of a cross-section thereof is larger than a diameter of a cross-section of the first cover hollow portion.

The cover member of the motor assembly may include a first cover inner circumferential portion surrounding the first cover hollow portion, a second cover inner circumferential portion surrounding a portion of the second cover hollow portion, and a third cover inner circumferential portion continuous with the second cover inner circumferential portion, and surrounding a remaining portion of the second cover hollow portion. The second cover inner circumferential portion may face the curved portion and may be rounded to be convex radially outwardly. The third cover inner circumferential portion may face the flat portion and may be formed flat.

In order to achieve those aspects and other advantages of the present disclosure, there is provided a circuit breaker that may include a circuit breaker body electrically connected to external power source and load, a mechanism accommodated inside the circuit breaker body and allowing or blocking the electrical connection, and a motor assembly engaged with a gear assembly of the mechanism and operated by an external control power source. The motor assembly may include a motor electrically connected to an external power source, a shaft coupled to the motor to be rotated together with the motor, and extending in one direction, a gear member through which the shaft is coupled to be rotated together, a bush member through which the shaft is coupled and which is coupled through the gear member, so as to be located between the shaft and the gear member and rotated together with the shaft, and a cover member located to face the motor with the gear member and the bush member interposed therebetween, and rotated together with the shaft that is coupled therethrough. The bush member and the cover member may be formed of an insulating material.

An outer diameter of a cross-section of the gear member of the circuit breaker may be smaller than an outer diameter of each cross-section of the bush member and the cover member, and end portions of the gear member in the one direction may be covered by the bush member and the cover member, respectively.

The circuit breaker may further include a fastening member coupled to an end portion of the shaft in the one direction, and the cover member may be located between the gear member and the fastening member and support the fastening member.

According to an embodiment disclosed herein, the following effects can be achieved.

First, a motor assembly includes a motor and a shaft. The shaft may be coupled to the motor to be rotated together with the motor.

The shaft may be coupled to a bush member and a gear member. In one embodiment, the shaft may be coupled through each of the bush member and the gear member. At this time, the bush member is located between the shaft and the gear member. That is, the gear member is physically spaced apart from the shaft by the bush member.

The bush member is formed of an insulating material. Thus, the bush member prevents any electrical connection between the gear member and the shaft. That is, the gear member is physically spaced apart from the shaft by the bush member.

A fastening member is coupled to an end portion of the shaft in a direction in which the shaft extends. The fastening member prevents an arbitrary separation of other members through which the shaft is coupled in a longitudinal direction. At this time, a cover member is interposed between the fastening member and the gear member. The shaft is coupled through the cover member and the cover member is disposed to cover the gear member. Thus, the gear member is physically spaced from the fastening member.

The cover member is also formed of an insulating material. Thus, the cover member prevents any electrical connection between the gear member and the fastening member. That is, the gear member is physically spaced apart from the fastening member by the cover member.

Thus, any electrical connection of the shaft, the gear member, and the fastening member can be prevented. This can suppress control current, which is applied to operate the motor, from being transmitted to the gear member or the fastening member, thereby improving insulation performance.

With the configuration, the gear member is also physically and electrically spaced apart from the shaft and the fastening member. Accordingly, the gear member can be formed of a material having sufficient rigidity regardless of a conductivity level of the material. In one embodiment, the gear member may be formed of a steel material.

Accordingly, the gear member that transmits rotational force to the gear assembly as the motor operates can have sufficient rigidity. This can result in improving operational reliability of a mechanism when control current is applied.

Also, the bush member and the cover member are formed of an insulating material. In one embodiment, the bush member may be formed of a synthetic resin material such as reinforced plastic, a rubber material, or a ceramic material. Those materials are materials having specific elasticity while having insulating property, or materials having high rigidity.

Accordingly, the bush member and the cover member cannot be damaged despite physical or electric shocks generated when the circuit breaker is operated. This can stably maintain a coupling state between other components of the motor assembly and the bush member and the cover member.

As a result, insulation performance and operational reliability of the motor assembly can be secured even when physical and electrical shocks are transmitted from outside.

In addition, the bush member and the cover member are provided separately and coupled to the shaft, respectively. The gear member is coupled to the shaft through the bush member and covered by the cover member. This can minimize structural changes of the shaft, the gear member, and the fastening member.

Furthermore, the bush member includes a boss hollow portion formed in a shape corresponding to a shaft part of the shaft. The bush member includes a boss curved portion and a boss flat portion formed in a shape corresponding to a hollow part of the gear member.

The cover member includes a cover inner circumferential portion and a cover hollow portion formed in shapes corresponding to a curved portion and a flat portion of the shaft part and a boss curved portion and a boss flat portion of the bush member.

With the structure, the shaft and the gear member, the bush member and the cover member all of which are coupled to the shaft can be rotated together.

Therefore, even if a separate coupling member is not provided, the motor assembly can be operated as the motor is operated, so as to transmit rotational force to the gear assembly. This can minimize an increase in manufacturing time and costs for manufacturing the motor assembly.

Figure 11:
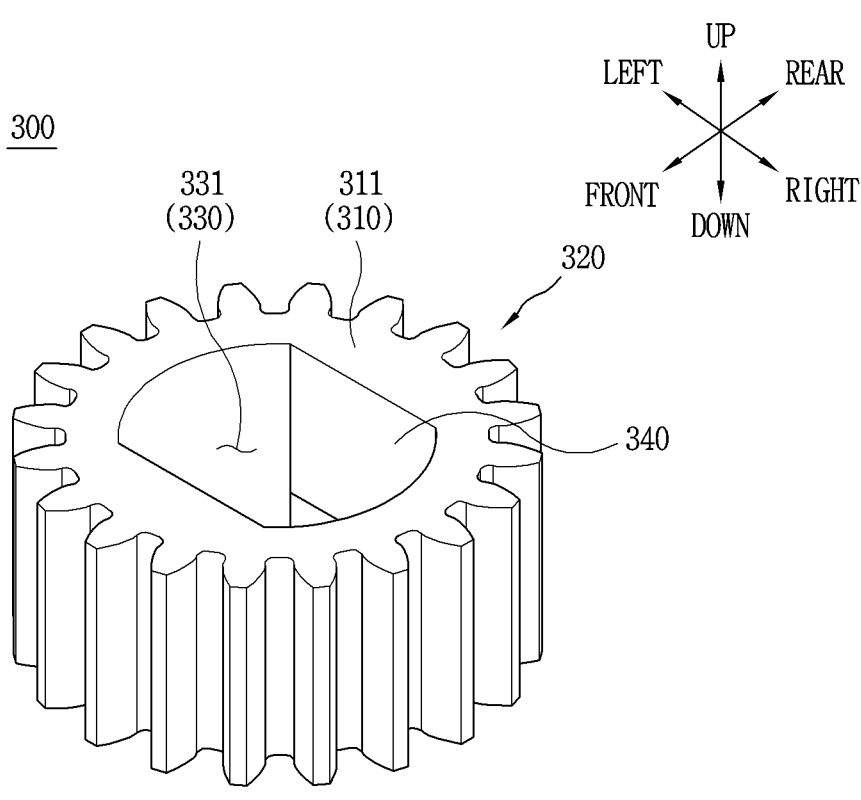
FIG. 11 is a perspective view illustrating a gear member disposed in the motor assembly of FIG. 4.
Figure 12:
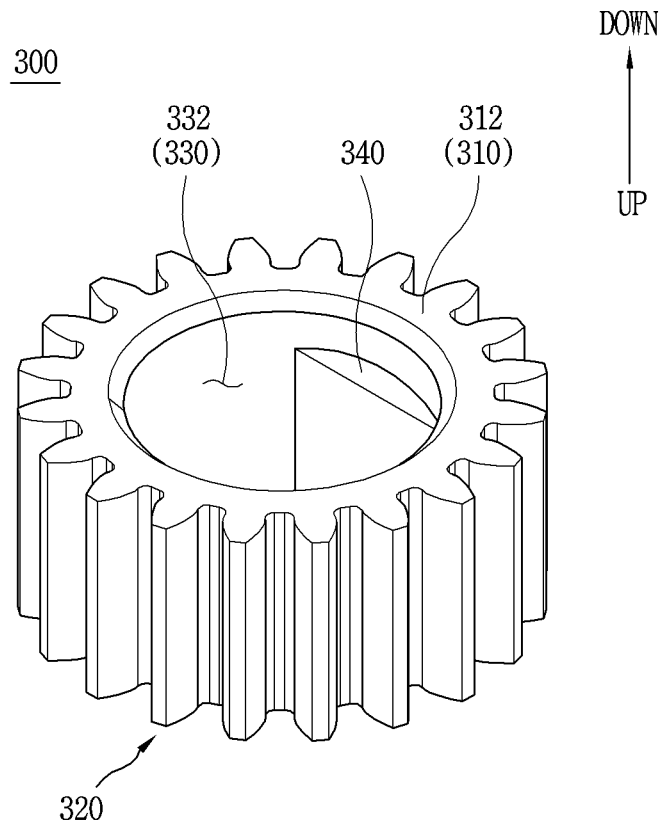
FIG. 12 is a perspective view illustrating the gear member of FIG. 11 at a different angle.
Figure 13:
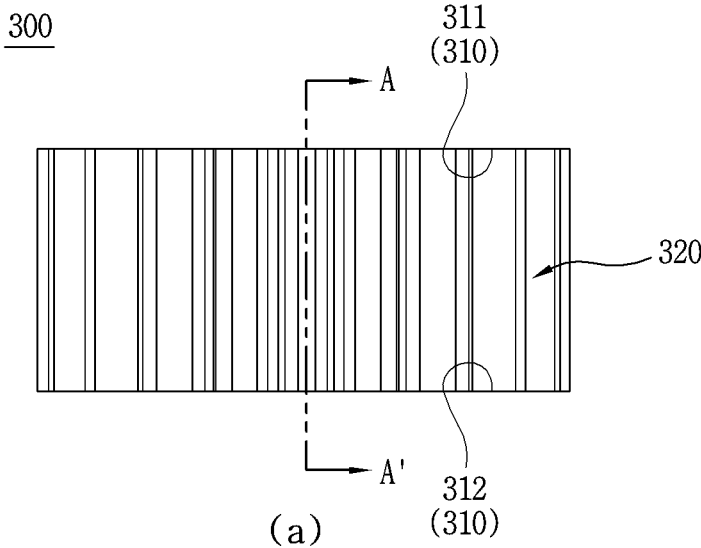
Figure 13:
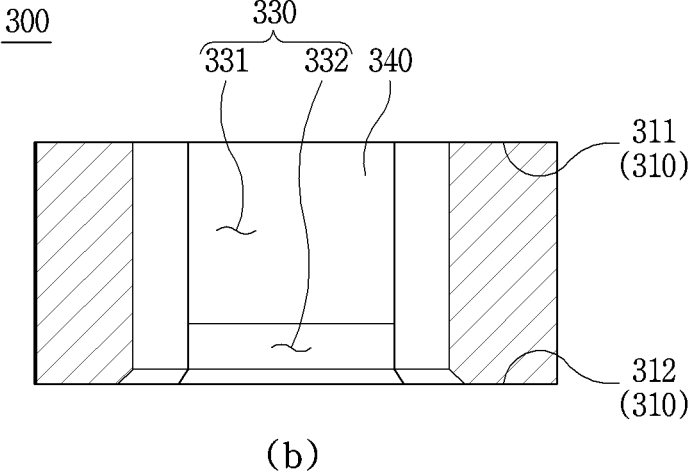

(a) of FIG. 13 is a front view of the gear member of FIG. 11, and (b) of FIG. 13 is a sectional view taken along the line A-A'.

Figure 14:
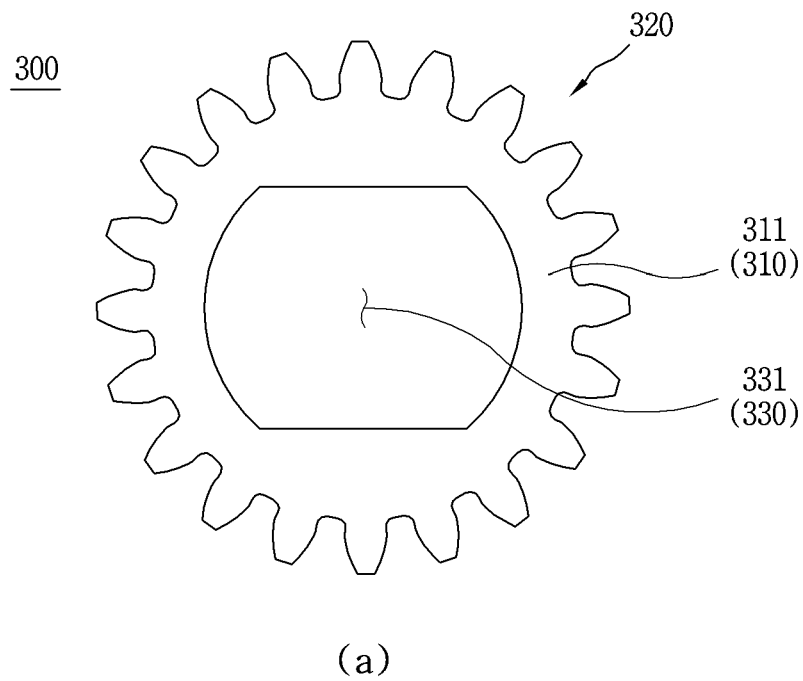
Figure 14:
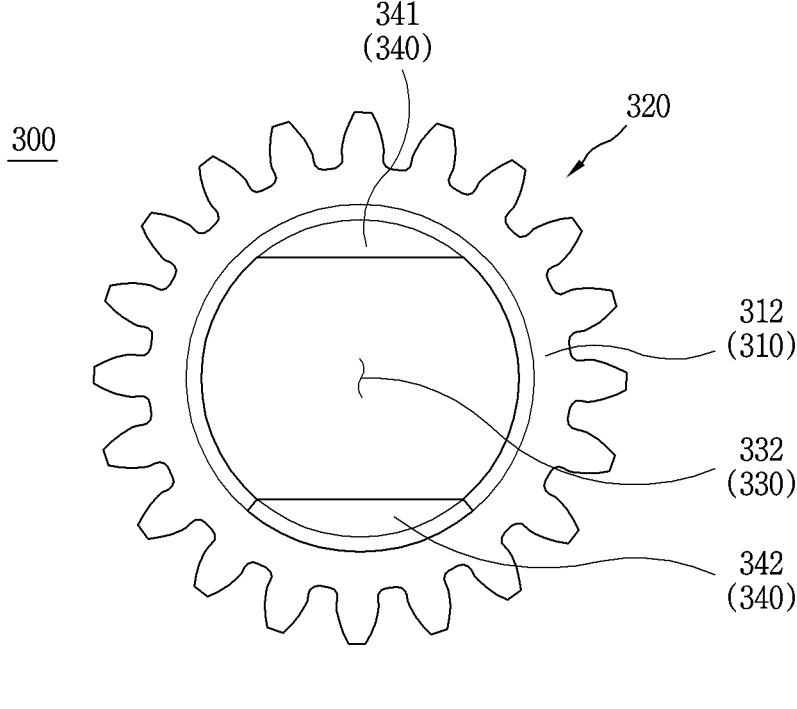

(a) of FIG. 14 is a planar view of the gear member of FIG. 11, and (b) of FIG. 14 is a bottom view of the gear member.

Figure 4:
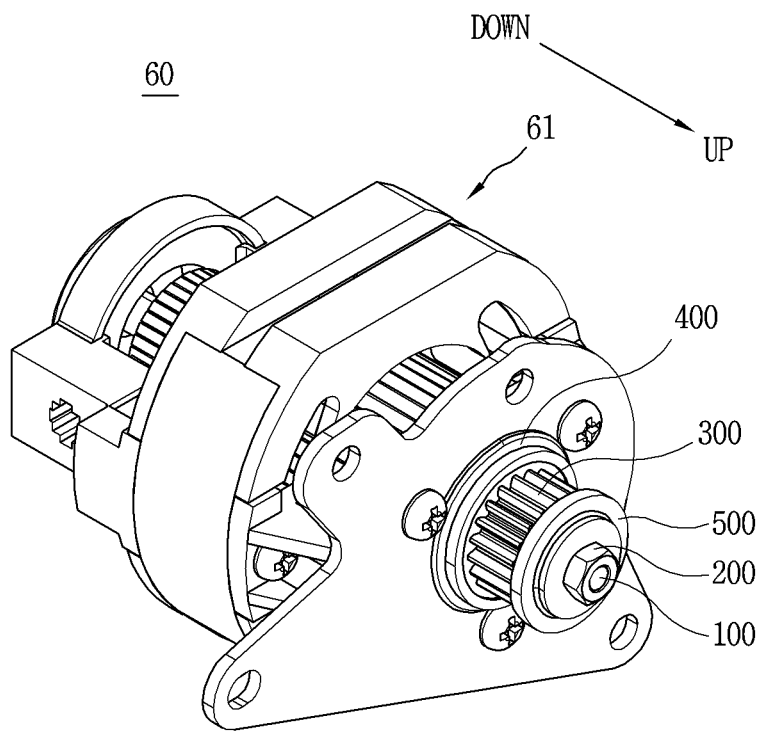
FIG. 4 is a perspective view illustrating a motor assembly in accordance with one embodiment.
Figure 5:
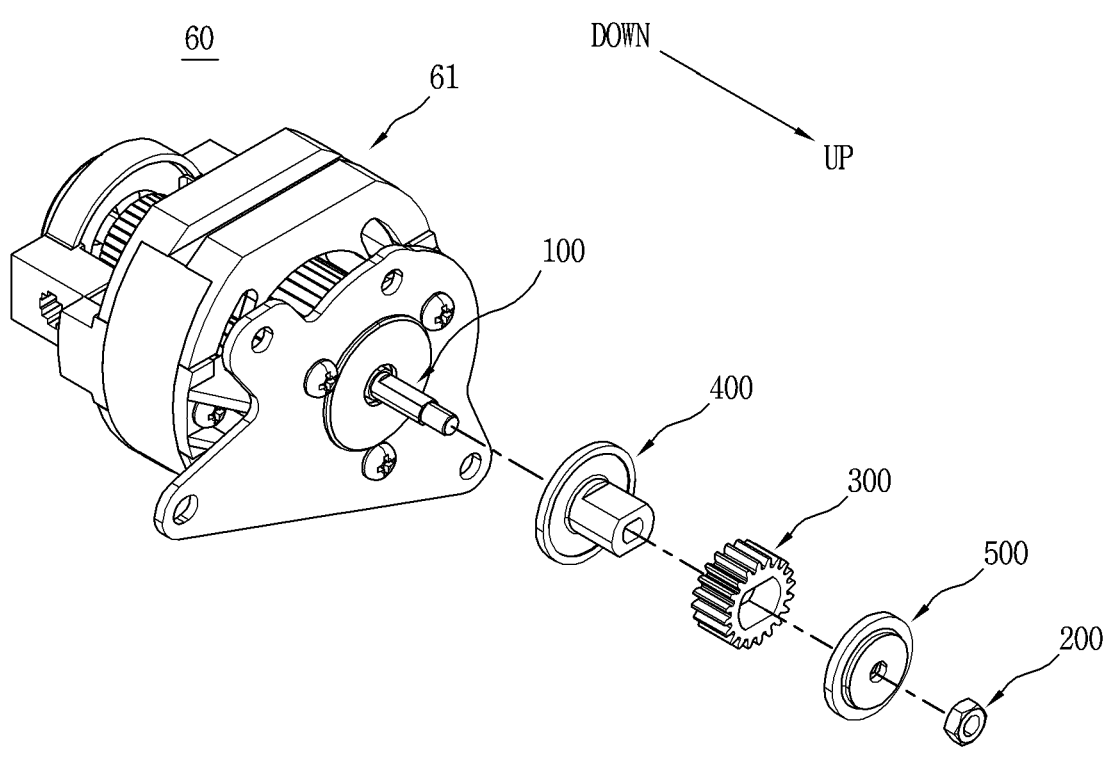
FIG. 5 is an exploded perspective view illustrating the motor assembly of FIG. 4.
Figure 6:
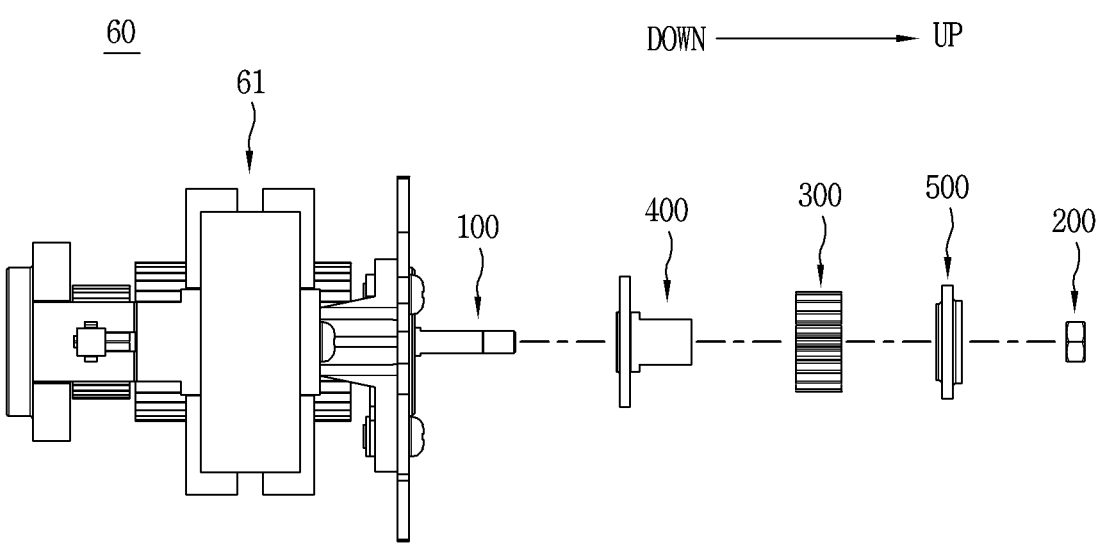
FIG. 6 is an exploded front view illustrating the motor assembly of FIG. 4.
Figure 7:
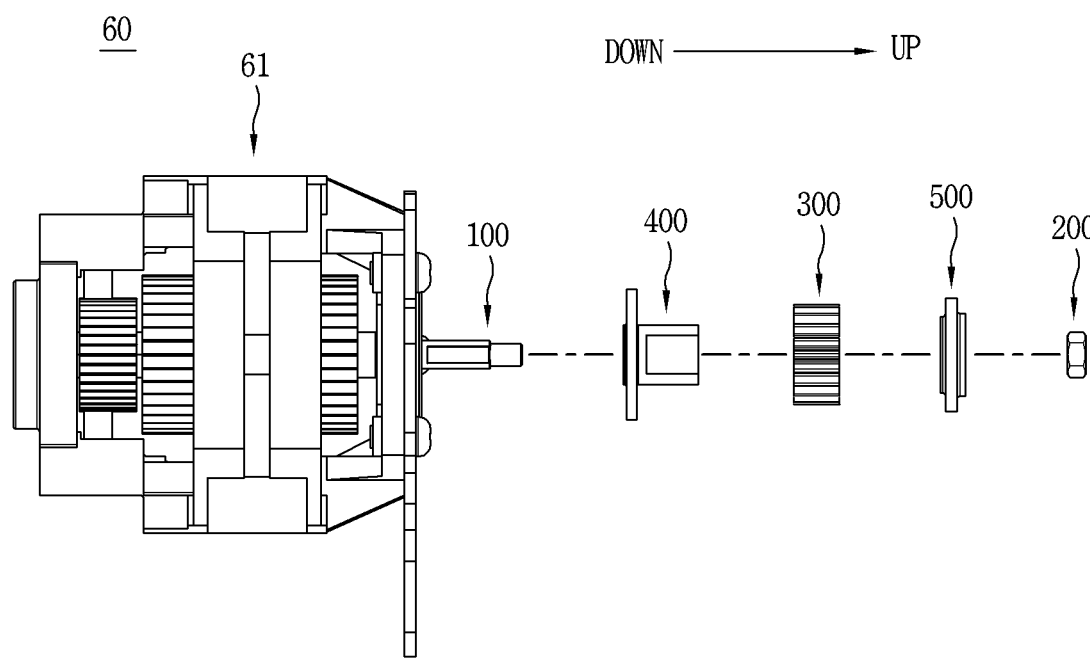
FIG. 7 is an exploded planar view illustrating the motor assembly of FIG. 4.
Figure 15:
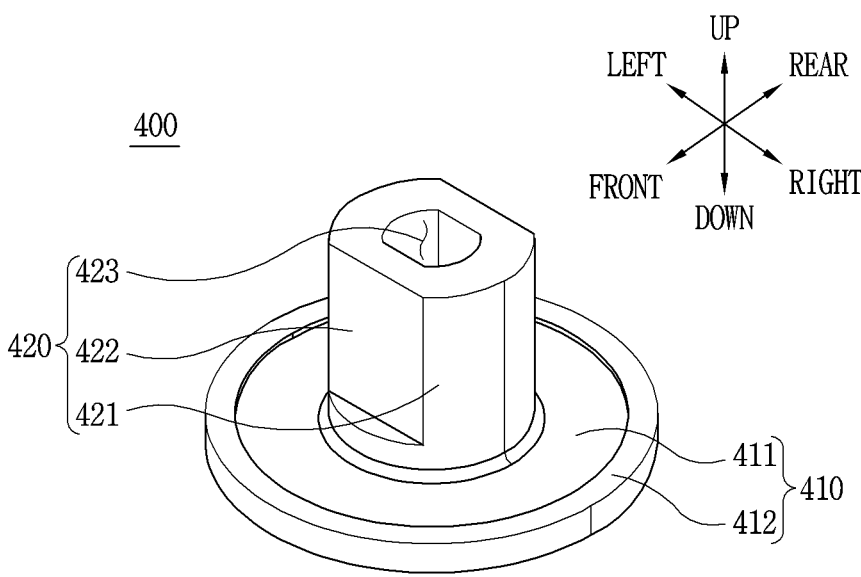

FIG. 15 is a perspective view illustrating a bush member disposed in the motor assembly of FIG. 4.

Figure 16:
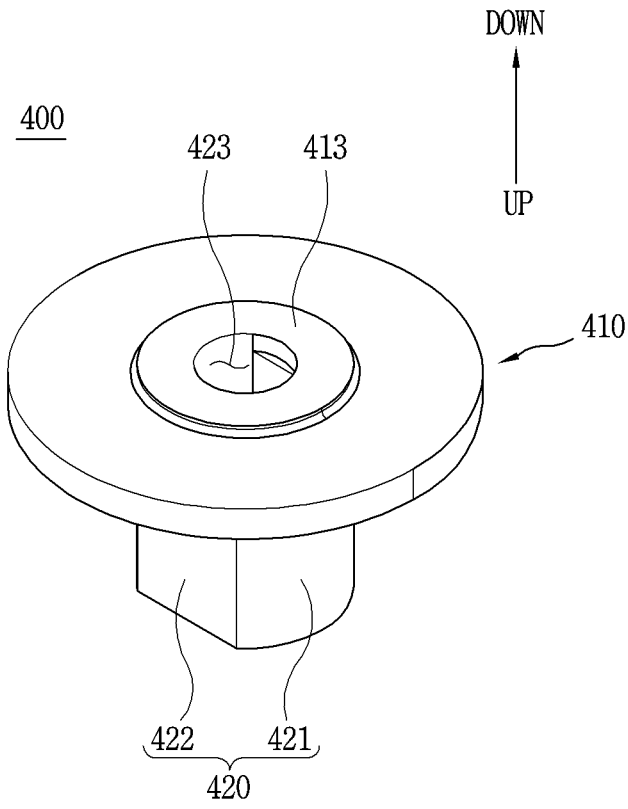

FIG. 16 is a perspective view illustrating the bush member of FIG. 15 at a different angle.

Figure 17:
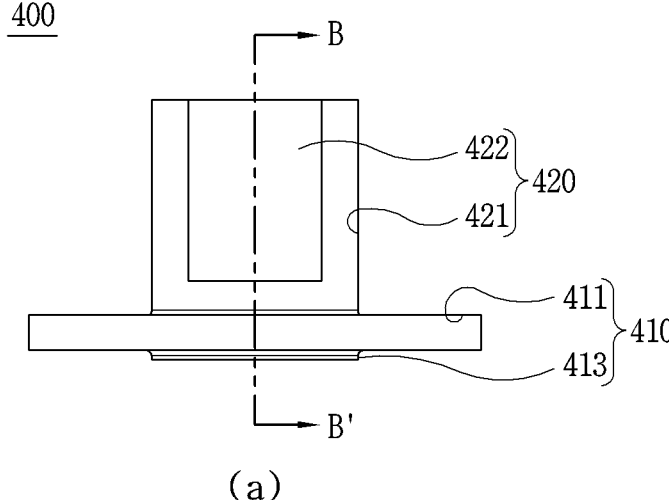
Figure 17:
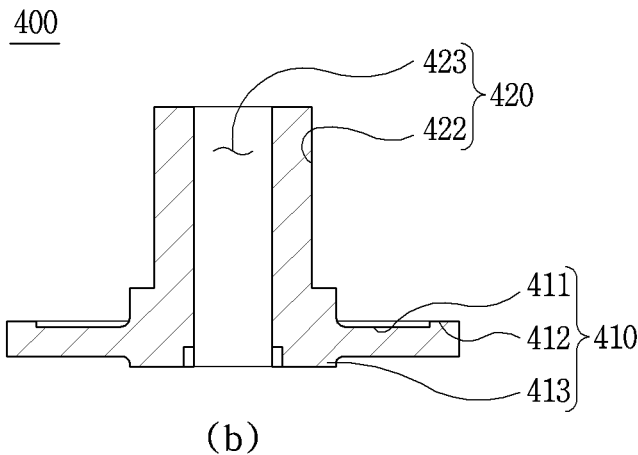

(a) of FIG. 17 is a front view of the bush member of FIG. 15, and (b) of FIG. 17 is a sectional view taken along the line B-B'.

Figure 18:
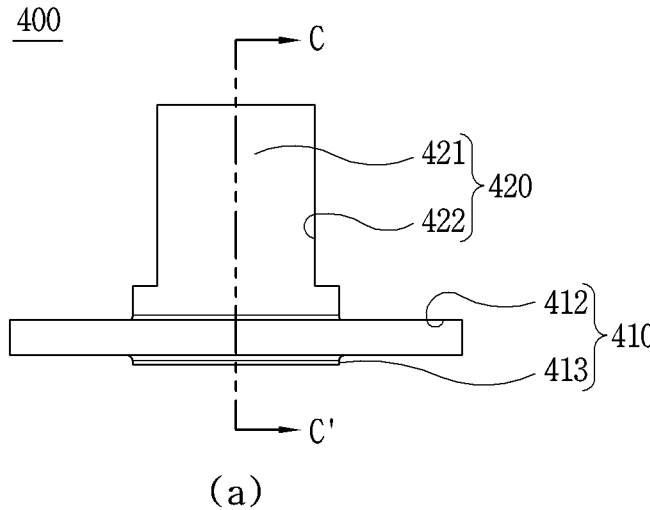
Figure 18:
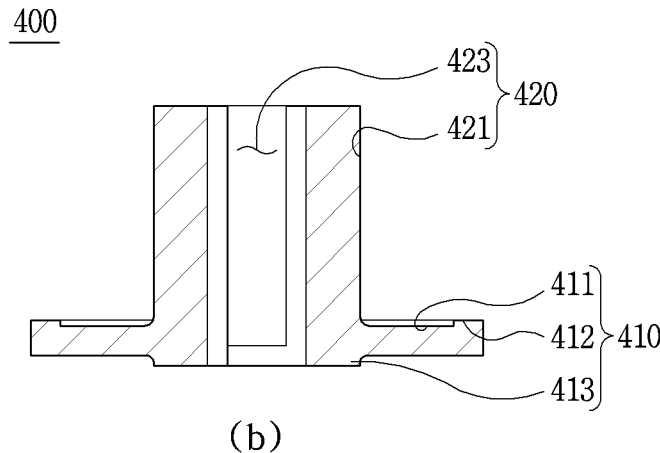

(a) of FIG. 18 is a lateral view of the bush member of FIG. 15, and (b) of FIG. 18 is a sectional view taken along the line C-C'.

Figure 19:
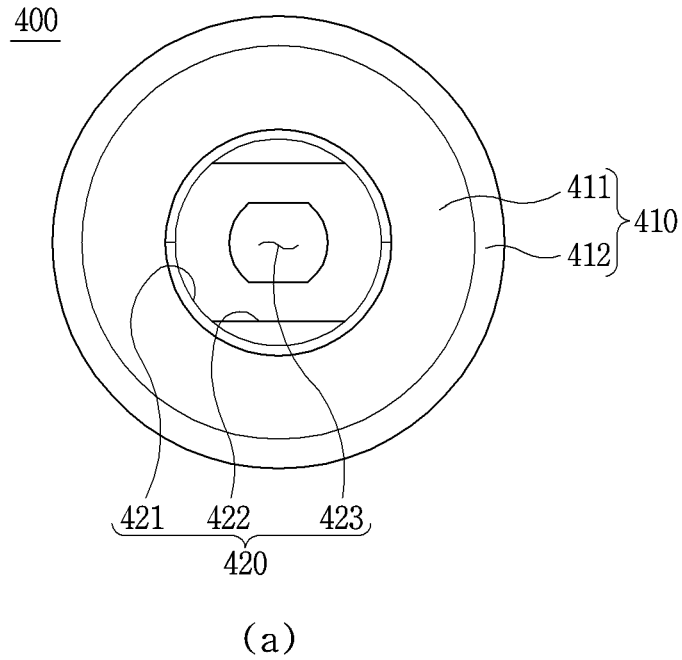
Figure 19:
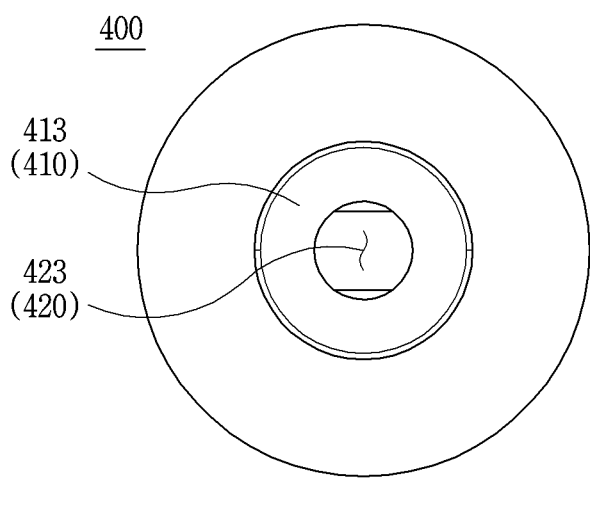

(a) of FIG. 19 is a planar view of the bush member of FIG. 15, and (b) of FIG. 19 is a bottom view of the bush member.

Figure 20:
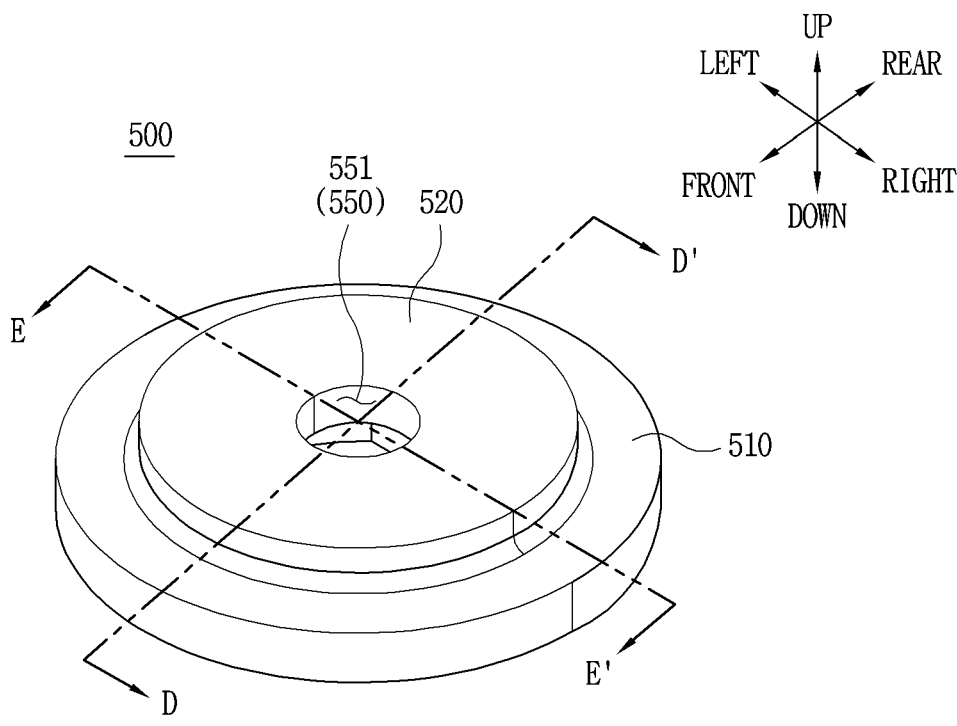

FIG. 20 is a perspective view illustrating a cover member disposed in the motor assembly of FIG. 4.

Figure 21:
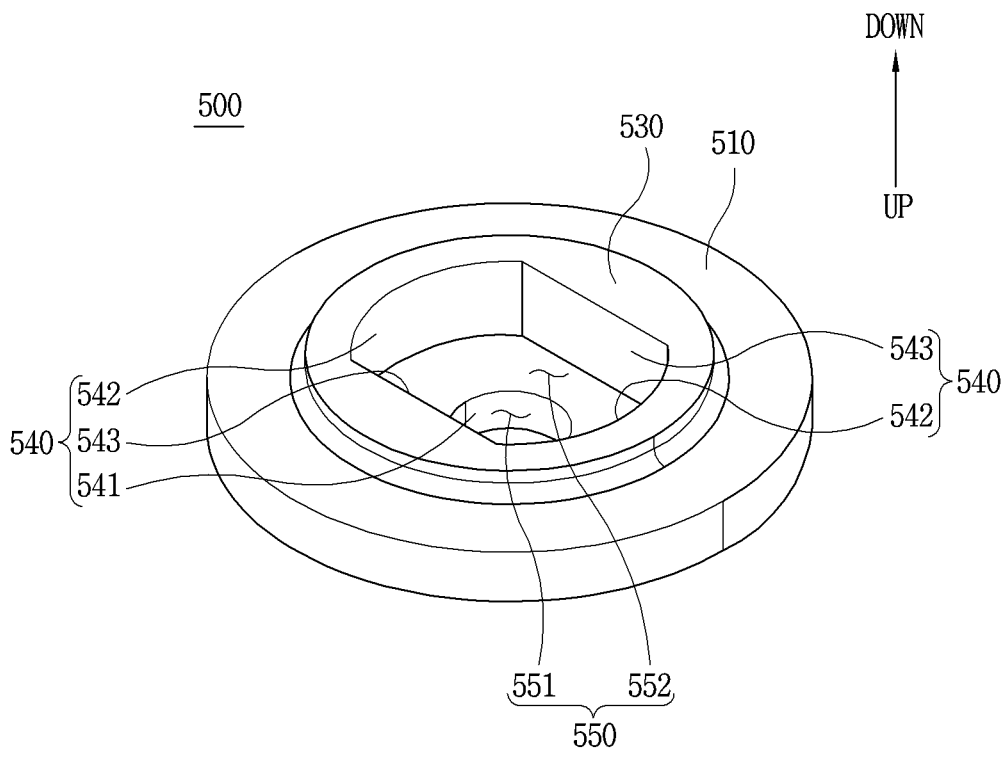

FIG. 21 is a perspective view illustrating the cover member of FIG. 20 at a different angle.

Figure 22:
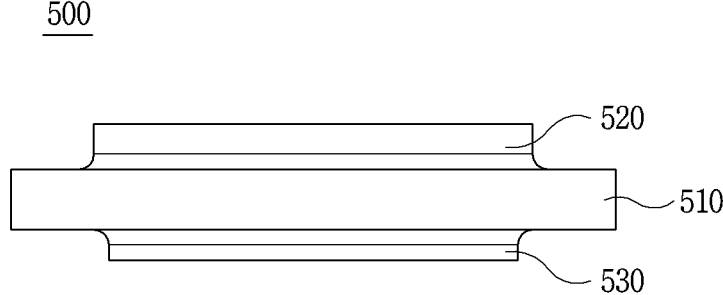

FIG. 22 is a front view illustrating the cover member of FIG. 20.

Figure 23:
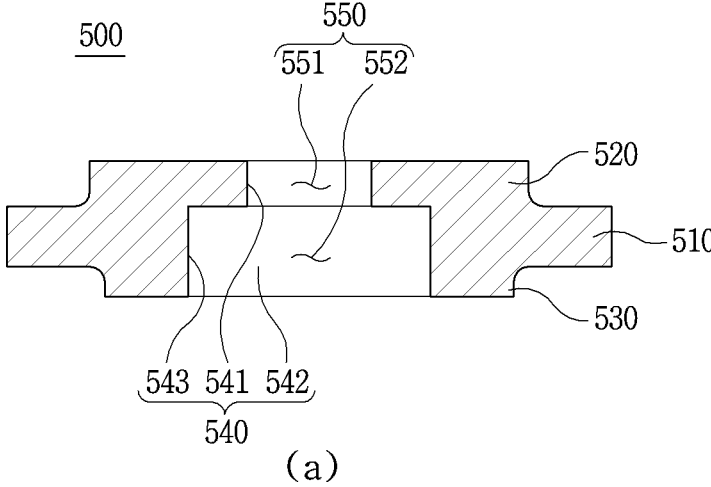
Figure 23:
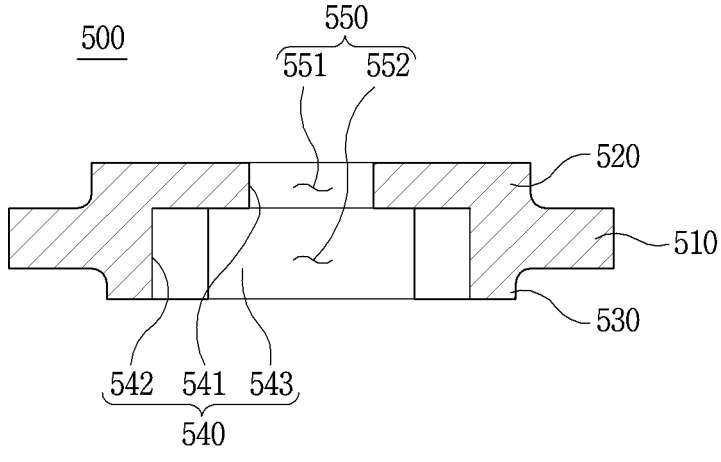

(a) of FIG. 23 is a sectional view illustrating the cover member of FIG. 20, taken along the line D-D', and (b) of FIG. 23 is a sectional view of the cover member, taken along the line E-E'.

Figure 24:
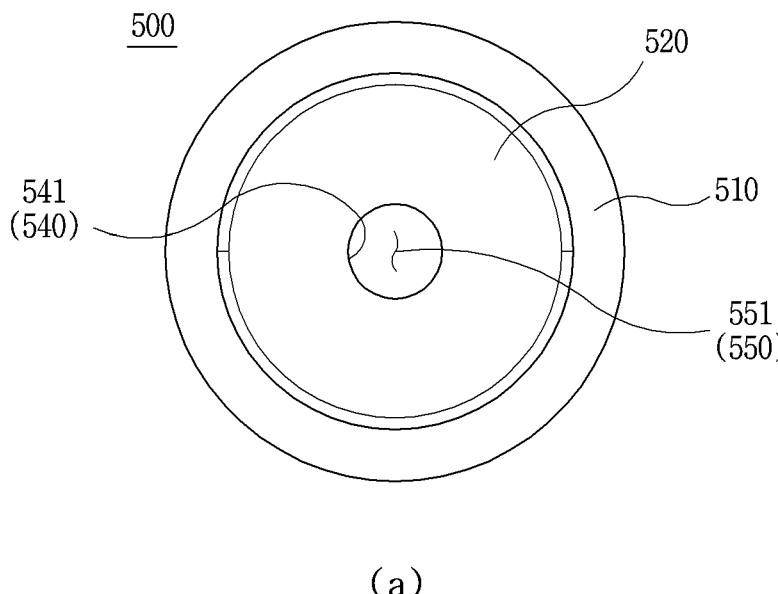
Figure 24:
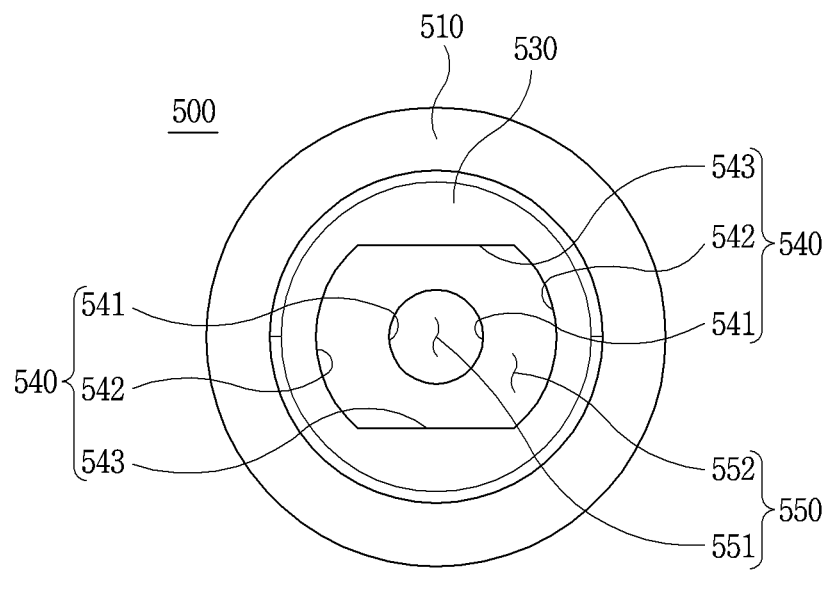

(a) of FIG. 24 is a planar view of the cover member of FIG. 20, and (b) of FIG. 24 is a bottom view of the cover member.

DETAILED DESCRIPTION

Hereinafter, a motor assembly 60 and a circuit breaker 1 including the same according to an embodiment of the present disclosure will be described in detail with reference to the accompanying drawings.

In the following description, descriptions of some components will be omitted to help understanding of the present disclosure.

1. Definition of Terms

The term "electrical connection" used in the following description means a state in which two or more different members can receive currents or electrical signals from each other. In one embodiment, the electrical connection may be implemented in a wired manner by a conducting wire or the like or in a wireless manner by Wi-Fi or Bluetooth.

The terms "top", "bottom", "left", "right", "front" and "rear" used in the following description will be understood based on a coordinate system illustrated in FIGS. 4 to 8, 11, 12, 15, 16, 20 and 21.

Figure 1:
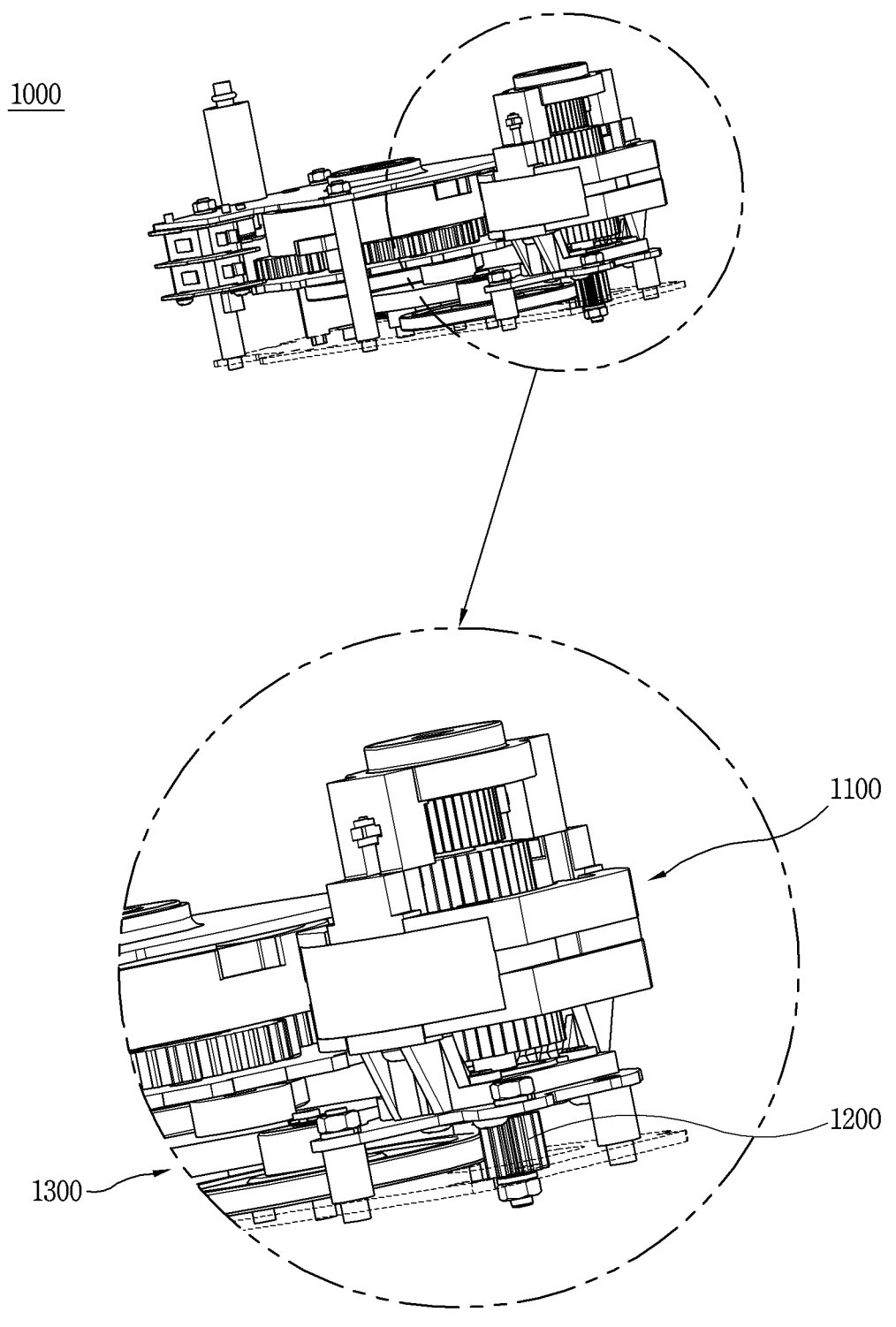
FIG. 1 is a perspective view illustrating an inside of a mechanism disposed in a circuit breaker according to the related art.
Figure 2:
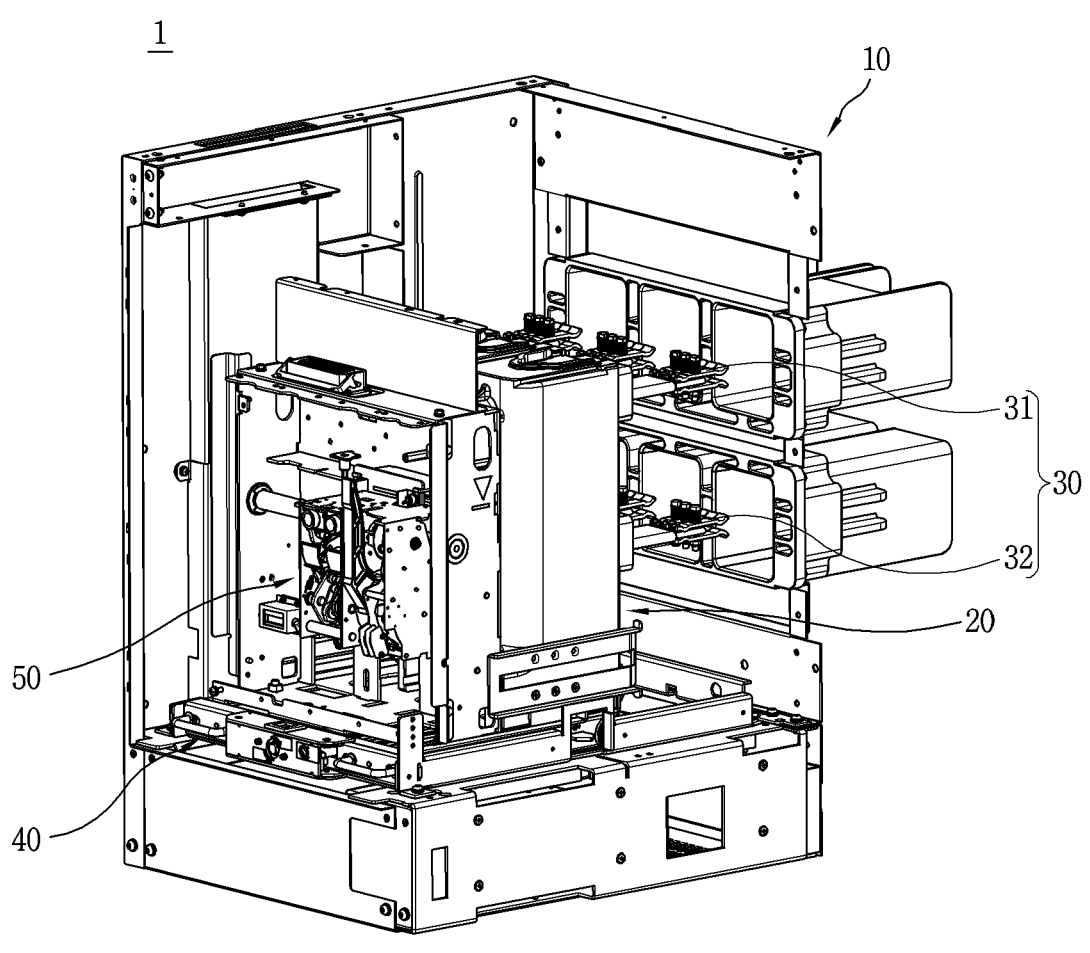
FIG. 2 is a perspective view illustrating a circuit breaker in accordance with one embodiment.
Figure 3:
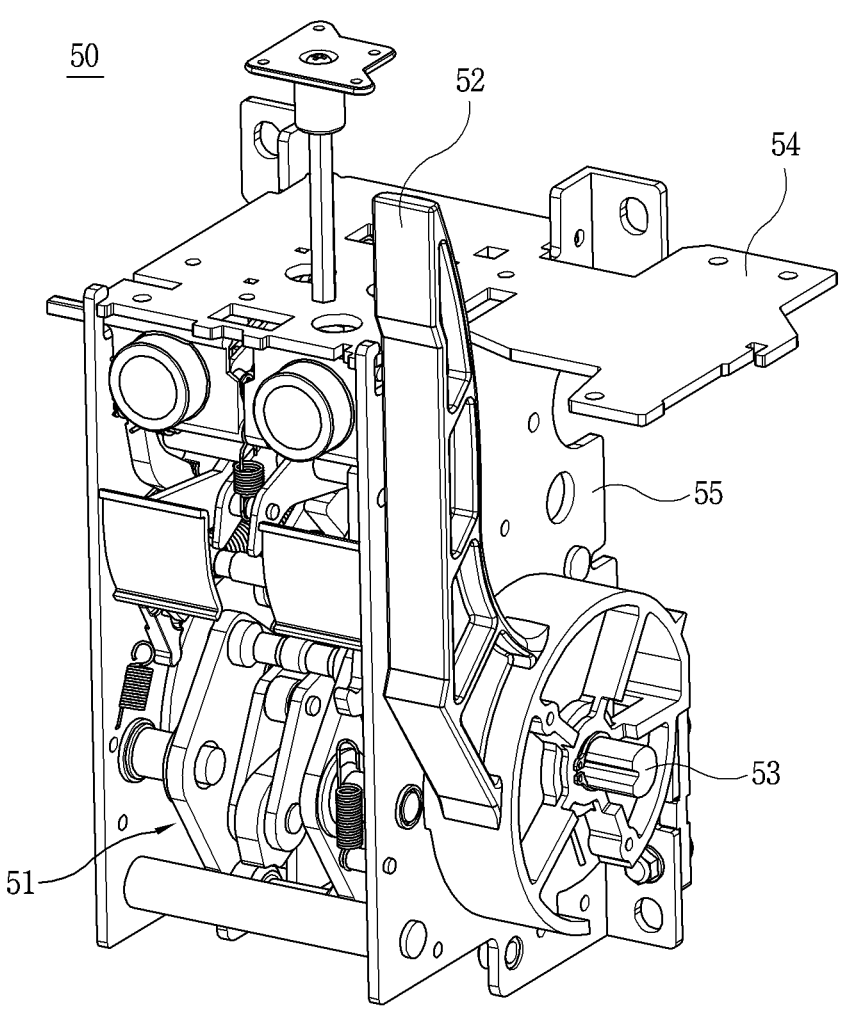
FIG. 3 is a perspective view illustrating a mechanism disposed in the circuit breaker of FIG. 2.

2. Description of Configuration of Circuit Breaker 1 According to Embodiment Referring to FIGS. 2 and 3, a circuit breaker 1 according to an embodiment is illustrated.

The circuit breaker 1 is electrically connected to external power source and load. The circuit breaker 1 may be shorted or open to be electrically connected to or disconnected from the external power source and load.

To this end, control power is supplied the circuit breaker 1. The circuit breaker 1 is electrically connected to an external control power source through a wire member (not illustrated). When control power is applied, a motor 61 of a motor assembly 60 to be described below may be operated so that the circuit breaker 1 can work.

At this time, the motor 61 should be separated from an external distribution box 10 or a circuit breaker body 20 (that is, the motor 61 should not be electrically connected to the external distribution box 10 or the circuit breaker body 20), which can be achieved by a bush member 400 and a cover member 500 to be described later.

Since the process of operating the circuit breaker 1 is a well-known technique, a detailed description thereof will be omitted.

In the illustrated embodiment, the circuit breaker 1 includes a distribution box 10, a circuit breaker body 20, a terminal part 30, a cart part 40, and a mechanism 50. Referring to FIG. 4, the circuit breaker according to the illustrated embodiment further includes a motor assembly 60.

Hereinafter, each component of the circuit breaker 1 will be described in detail with reference to the accompanying drawings, and the motor assembly 60 will be described as a separate clause.

The distribution box 10 accommodates the circuit breaker body 20. That is, the distribution box 10 functions as an outer housing of the circuit breaker body 20.

A space is defined inside the distribution box 10. The circuit breaker body 20 may be accommodated in the space. In addition, an arbitrary electric device for operating the circuit breaker body 20 may be accommodated in the space defined inside the distribution box 10.

In the illustrated embodiment, the distribution box 10 has a rectangular parallelepiped shape having a vertical height. The distribution box 10 may have any shape in which the circuit breaker body 20 and the electric device can be accommodated.

The circuit breaker body 20 is electrically connected to or disconnected from the external power source and load such that the external power source and load can be electrically connected to or disconnected from each other.

The circuit breaker body 20 is accommodated in the inner space of the distribution box 10. In one embodiment, the circuit breaker body 20 can be slid into or out of the distribution box 10.

In the embodiment, the position of the circuit breaker body 20 may be adjusted in the inner space of the distribution box 10.

That is, the circuit breaker body 20 may be completely accommodated inside the distribution box 10 to be located at a position close to an opposite side to an insertion direction (i.e., a rear side in the illustrated embodiment). At this position, a terminal part 30 that is electrically connected to the circuit breaker body 20 may be electrically connected to the external power source and load. Accordingly, the position may be defined as a run (service) position.

In addition, the circuit breaker body 20 may be located at a position closer to the insertion direction than the run position. At this position, the terminal part 30 is electrically disconnected from the external power source and load, and the circuit breaker body 20 can operate only for operation test. Accordingly, the position may be defined as a test position.

That is, in the circuit breaker body 20, the terminal part 30 may be brought into contact with or spaced apart from an external terminal, which is disposed in the distribution box 10, so as to be electrically connected to or disconnected from the external power source and load.

The circuit breaker body 20 is electrically connected to an external control power source. It will be understood that the control power source is a different power source from the power source. That is, the control power source applies power for driving a motor 61 to be described later, and is different from the power source that is electrically connected to or disconnected from the circuit breaker body 20.

The electrical connection may be achieved by a wire member (not illustrated) or the like.

The terminal part 30 is disposed on one side of the circuit breaker body 20, namely, the rear side in the illustrated embodiment.

The circuit breaker body 20 is electrically connected to the external power source and load through the terminal part 30. Specifically, the terminal part 30 is electrically brought into contact with or separated from a terminal (no reference numeral given) disposed in the distribution box 10, so as to be electrically connected to or disconnected from the external power source and load.

In addition, the terminal part 30 is electrically connected to each component provided inside the circuit breaker body 20. Accordingly, when the terminal part 30 is brought into contact with the terminal (no reference numeral given) of the distribution box 10, the circuit breaker body 20 can be electrically connected to the external power source and load.

The terminal part 30 may be provided in plurality. The plurality of terminal parts 30 may be horizontally spaced apart from one another, namely, spaced apart from one another in left and right directions in the illustrated embodiment.

In the illustrated embodiment, three terminal parts 30 are provided to be spaced apart from one another in the left and right directions. This results from that currents applied to the circuit breaker body 20 are three-phase currents.

The number of the terminal part 30 may vary depending on the number of phases of currents applied to the circuit breaker body 20.

In the illustrated embodiment, the terminal part 30 includes a bus bar terminal 31 and a load terminal 32.

The bus bar terminal 31 is brought into contact with or separated from a bus bar terminal (no reference numeral given) disposed in the distribution box 10. When the terminal part 31 is brought into contact with the terminal (no reference numeral given) of the distribution box 10, the circuit breaker body 20 can be electrically connected to the external power source and load.

In the illustrated embodiment, the bus bar terminal is located above the load terminal 32. The position of the bus bar terminal 31 may vary depending on the position of the bus bar terminal (no reference numeral given).

The load terminal 32 is brought into contact with or separated from a load terminal (no reference numeral given) disposed in the distribution box 10. When the load terminal 32 is brought into contact with the load terminal (no reference numeral given) of the distribution box 10, the circuit breaker body 20 can be electrically connected to the external load.

In the illustrated embodiment, the load terminal is located below the bus bar terminal 31. The position of the load terminal 32 may vary depending on the position of the load terminal portion (no reference numeral given).

The cart part 40 supports the circuit breaker body 20. The cart part 40 may slide along a rail (not illustrated) located in the inner space of the distribution box 10. Accordingly, the circuit breaker body 20 seated on the cart part 40 may be moved in a direction to be inserted into the inner space of the distribution box 10 or to be pulled out of the inner space.

In addition, the cart part 40 may be stopped and fixed at an arbitrary point on the rail (not illustrated). Accordingly, the circuit breaker body 20 can be fixed on the service or test position.

The mechanism 50 shorts or opens components inside the circuit breaker body 20. Accordingly, the external power source and load that are electrically connected to the circuit breaker main body 20 can be electrically connected to or disconnected from each other.

The mechanism 50 is accommodated inside the circuit breaker body 20. At this time, the mechanism 50 may be partially exposed to the outside to be manually operated by an operator.

In order for the circuit breaker body 20 to be closed, a closing spring (not illustrated) provided on the mechanism 50 must be charged. The charging process of the closing spring (not illustrated) may be performed manually or electrically.

When the charging process of the closing spring (not illustrated) is manually performed, the operator may press and rotate a handle 52 to charge the closing spring (not illustrated).

When the charging process of the closing spring (not illustrated) is electrically performed, the closing spring (not illustrated) may be charged as the motor 61 is rotated by external control power applied.

In this case, it is required to maintain an insulation state between the motor 61 and other components. Therefore, the motor assembly 60 according to the embodiment of the present disclosure includes a bush member 400 and a cover member 500, which will be described in detail later.

In the illustrated embodiment, the mechanism 50 includes a gear assembly 51, a handle 52, a camshaft 53, a top plate 54, and a side plate 55.

The gear assembly 51 is gear-coupled with a gear member 300 of the motor assembly 60. When the motor 61 is operated to rotate the gear member 300, the gear assembly 51 may also be rotated. Accordingly, the closing spring (not illustrated) can be electrically charged.

Although not specifically illustrated, the gear assembly 51 may include a plurality of gears. The plurality of gears are gear-coupled with one another and thus can be rotated clockwise or counterclockwise as the motor 61 is operated.

The handle 52 is rotated by an operator. That is, as described above, the charging process of the closing spring (not illustrated) may also be performed manually. When the handle 52 is rotated, the camshaft 53 coupled to the handle 52 may be rotated clockwise or counterclockwise together, so that the closing spring (not illustrated) can be charged.

Therefore, the handle 52 is disposed to be exposed to the outside of the mechanism 50 so that the operator can grip and manipulate it. The handle 52 may be rotated centering on the camshaft 53.

The camshaft 53 functions as a central axis around which the handle 52 rotates. In addition, the camshaft 53 is coupled with the handle 52 and rotates as the handle 52 rotates.

Also, as the camshaft 53 is coupled to the gear assembly 51, the gear assembly 51 can also rotate when the camshaft 53 rotates. Accordingly, the closing spring (not illustrated) can be manually charged.

The top plate 54 defines one side of the mechanism 50, namely, an upper side in the illustrated embodiment. The top plate 54 covers a component disposed on the mechanism 50, that is, the gear assembly 51, from the upper side. In addition, the top plate 54 also covers the motor assembly 60 engaged with the gear assembly 51 from the upper side.

The top plate 54 is coupled to the side plate 55.

The side plate 55 defines another side of the mechanism 50, namely, a right side in the illustrated embodiment. The side plate 55 covers a component disposed on the mechanism 50, namely the gear assembly 51, on another side, namely, the right side in the illustrated embodiment. In addition, the side plate 55 also covers the motor assembly 60 engaged with the gear assembly 51 from the another side.

Accordingly, the gear assembly 51 and the motor assembly 60 disposed on the mechanism 50 are surrounded by the top plate 54 and the side plate 55 and thus are not exposed to the outside.

The side plate 55 may be provided with a plurality of through holes. The camshaft 53 and the shaft 100 of the motor assembly 60 may be rotatably coupled to the through holes. In one embodiment, the camshaft 53 and the shaft 100 may be coupled through the through holes.

That is, the side plate 55 rotatably supports the camshaft 53 and the shaft 100.

3. Description of Motor Assembly 60 According to Embodiment

Referring to FIGS. 4 to 7, the circuit breaker 1 according to the embodiment includes the motor assembly 60.

The motor assembly 60 is operated by control current applied by the external control power source. The motor assembly 60 may be rotated as the control current is applied, to charge the closing spring (not illustrated).

The motor assembly 60 is accommodated inside the mechanism 50. The motor assembly 60 may be surrounded by the top plate 54 and the side plate 55.

The motor assembly 60 is coupled to the side plate 55. Specifically, the motor assembly 60 may be rotatably coupled to the side plate 55.

On the other hand, each of components of the motor assembly 60 must be electrically spaced apart from an external housing, that is, a frame surrounding the mechanism 50. That is, each of the components of the motor assembly 60 must be prevented from being electrically connected to other components of the mechanism 50 as well as the top plate 54 and the side plate 55 surrounding the mechanism 50.

At the same time, in order to reliably transmit the rotation of the motor 61 to the gear assembly 51, rigidity of each component of the motor assembly 60, particularly, the gear member 300, must be guaranteed.

Accordingly, the motor assembly 60 according to the embodiment includes a bush member 400 and a cover member 500 to improve insulation performance while ensuring the rigidity of the gear member 300, so that operational reliability of the circuit breaker 1 can be improved.

In the illustrated embodiment, the motor assembly 60 includes a motor 61, a shaft 100, a fastening member 200, a gear member 300, a bush member 400, and a cover member 500.

The motor 61 is electrically connected to the external control power source. When control current is applied from the control power source, the motor 61 may rotate clockwise or counterclockwise. A rotational direction and a rotational speed of the motor 61 may be adjusted.

The motor 61 is connected to the shaft 100. When the motor 61 is operated, the shaft 100 may also rotate. Accordingly, the gear member 300 connected to the shaft 100 and the gear assembly 51 engaged with the gear member 300 can rotate.

The motor 61 may be provided in any form capable of being rotated by receiving control current.

In the illustrated embodiment, directions such as upper and lower sides are arbitrarily set for convenience of description, and it will be understood that they are irrelevant to a direction in which the motor assembly 60 is coupled to the circuit breaker 1.

Centers of cross-sections of the shaft 100, the fastening member 200, the gear member 300, the bush member 400, and the cover member 500 to be described below may be disposed on the same axis.

The shaft 100, the fastening member 200, the gear member 300, the bush member 400, and the cover member 500 may be rotated centering on the same central axis.

(1) Description of Shaft 100 and Fastening Member 200

Figure 8:
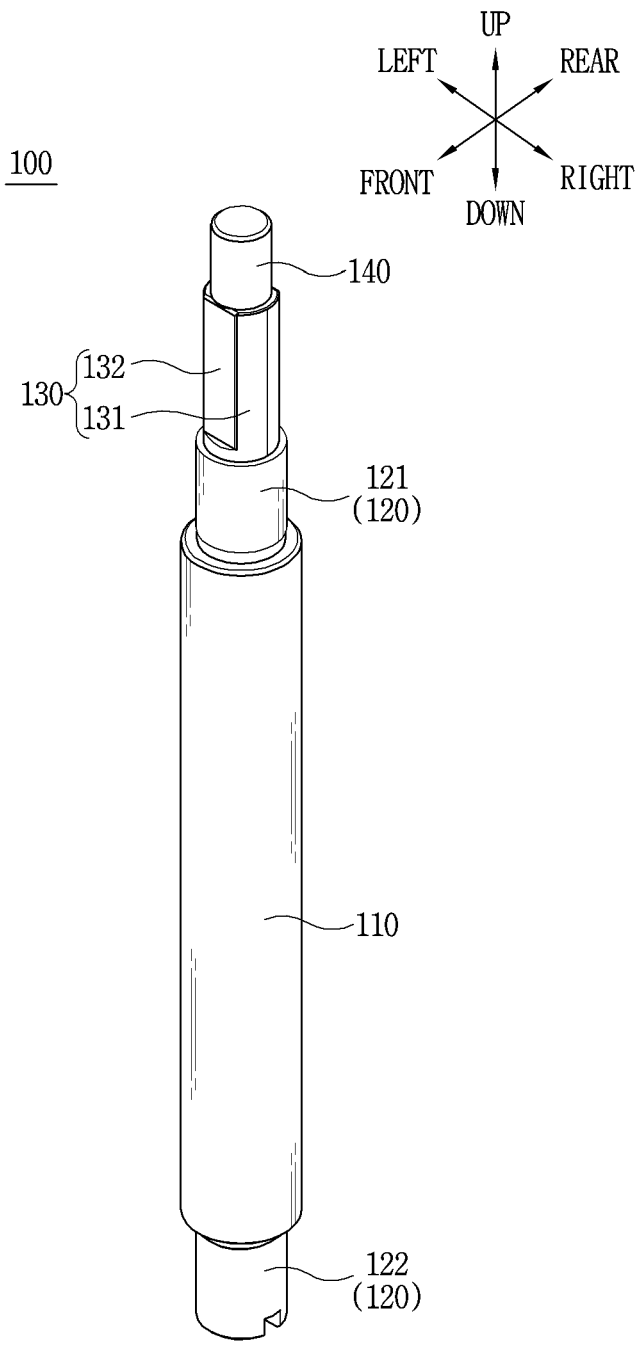
FIG. 8 is a perspective view illustrating a shaft disposed in the motor assembly of FIG. 4.
Figure 9:
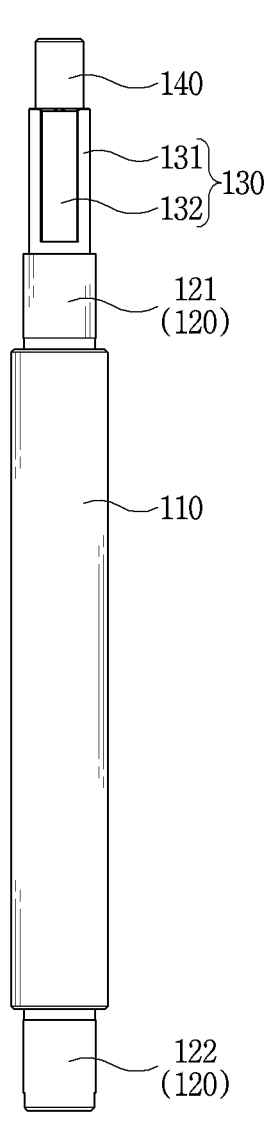
FIG. 9 is a front view illustrating the shaft of FIG. 8.
Figure 10:
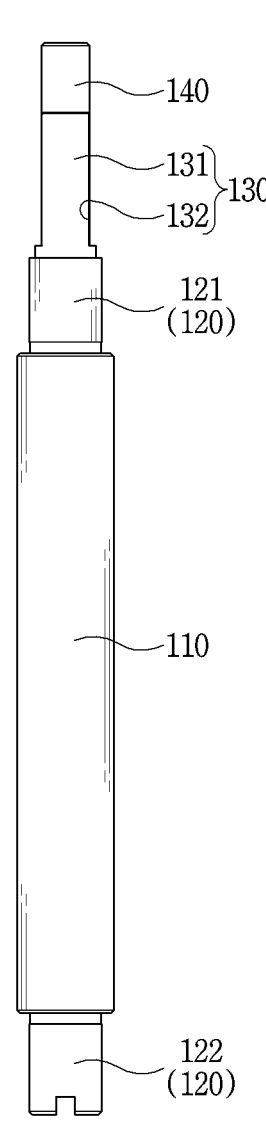
FIG. 10 is a lateral view illustrating the shaft of FIG. 8.

Referring to FIGS. 8 to 10, the motor assembly 60 according to the embodiment includes the shaft 100.

The shaft 100 is connected to the motor 61 and rotates clockwise or counterclockwise as the motor 61 operates. The rotation of the shaft 100 is transmitted to the gear assembly 51, so that a closing spring (not illustrated) can be charged.

The shaft 100 is coupled with other components of the motor assembly 60. Specifically, the bush member 400, the gear member 300, the cover member 500, and the fastening member 200 are sequentially coupled through the shaft 100.

At this time, the gear member 300 is indirectly coupled to the shaft 100 through the bush member 400. Thus, the gear member 300 and the shaft 100 are insulated from each other.

That is, the gear member 300 and the shaft 100 are electrically spaced apart from each other.

The shaft 100 may extend in one direction, namely, in an up and down (vertical) direction in the illustrated embodiment. One end portion of the shaft 100, namely, a lower end portion in the illustrated embodiment, is coupled to the motor 61. The shaft 100 may rotate together in response to the rotation of the motor 61.

The shaft 100 may be formed such that a diameter of its cross-section varies along its extension direction. A detailed description thereof will be described later.

The frame 100 may be formed of a material having high rigidity. This is to stably transmit the rotation of the motor 61 to the gear member 300. In one implementation, the shaft 100 may be formed of a steel material.

In the illustrated embodiment, the shaft 100 includes a body part 110, an extension part 120, a shaft part 130, and a head part 140.

The body part 110 is a part that extends longest among those parts of the shaft 100. The body part 110 extends in one direction, namely, in the vertical direction in the illustrated embodiment.

The body part 110 connects a first extension portion 121 and a second extension portion 122. That is, the body part 110 is located between the first extension portion 121 and the second extension portion 122.

The body part 110 has a predetermined cross-section. In the illustrated embodiment, the body part 110 is formed in a cylindrical shape having a circular cross-section and extending in the vertical direction. The shape of the body part 110 may vary as needed.

At this time, the diameter of the cross-section of the body part 110 may be larger than diameters of cross-sections of other components of the shaft 100, that is, the extension part 120, the shaft part 130, and the head part 140.

This can reinforce rigidity of the body part 110 that directly receives the rotation of the motor 61.

The extension part 120 is continuous with both end portions of the body part 110 in the extension direction, namely, upper and lower end portions in the illustrated embodiment.

The extension part 120 is a part where the shaft 100 is continuous with the motor 61 and the shaft part 130. The extension part 120 extends in one direction, namely, in the vertical direction in the illustrated embodiment.

The extension part 120 has a predetermined cross-section. In the illustrated embodiment, the extension part 120 is formed in a cylindrical shape having a circular cross-section and extending in the vertical direction. The shape of the extension part 120 may vary as needed.

At this time, a diameter of a cross-section of the extension part 120 may be smaller than the diameter of the cross-section of the body part 110. In addition, the diameter of the cross-section of the extension part 120 may be larger than the diameters of the cross-sections of the shaft part 130 and the head part 140.

Thus, a step is formed between the body part 110 and the extension part 120 due to a difference between the diameters of the cross-sections. Similarly, a step is formed between the extension part 120 and the shaft part 130 due to a difference between the diameters of the cross-sections.

The extension part 120 may be divided (provided) in plurality, to extend from the body part 110 at different positions. In the illustrated embodiment, the extension part 120 is divided into two, including the first extension portion 121 and the second extension portion 122, to extend from (be continuous with) upper and lower sides of the body part 110, respectively.

The first extension portion 121 is continuous with one side of the body part 110, namely, the upper side in the illustrated embodiment. In addition, one side of the first extension portion 121, which is opposite to the body part 110, of both sides of the first extension portion 121 in the extension direction, namely, an upper side in the illustrated embodiment is continuous with the shaft part 130.

The second extension portion 122 is continuous with another side of the body part 110, namely, the lower side in the illustrated embodiment. The second extension portion 122 is a portion where the shaft 100 is coupled with the motor 61.

Thus, as illustrated, the second extension portion 122 may be provided with a recessed groove at an end portion thereof. A protrusion (not illustrated) provided on the motor 61 may be coupled into the groove. Accordingly, when the motor 61 rotates, the shaft 100 can rotate together with the motor 61 without idling.

The shaft part 130 is located on the one side of the first extension portion 121 opposite to the body part 110, namely, the upper side in the illustrated embodiment.

The gear member 300, the bush member 400, and the cover member 500 are coupled to the shaft part 130. As the shaft part 130 rotates, the gear member 300, the bush member 400, and the cover member 500 may rotate together.

The shaft part 130 is continuous with the first extension portion 121. In the illustrated embodiment, the shaft part 130 is continuous with an upper end of the first extension portion 121.

The shaft part 130 is coupled to the bush member 400. Specifically, the shaft part 130 is coupled through a boss hollow portion 423 of the bush member 400.

The shaft part 130 extends in one direction, namely, in the vertical direction in the illustrated embodiment.

The shaft part 130 has a predetermined cross-section. In the illustrated embodiment, the shaft part 130 is formed in the shape of a planar figure that has a circular cross-section with a chord defining a part of an outer circumference.

At this time, a diameter of a cross-section of the shaft part 130, that is, a length of a straight line that passes each curve and a center of the cross-section of the shaft part 130 may be smaller than a diameter of a cross-section of the body part 110 and a diameter of a cross-section of the first extension portion 121. In addition, the diameter of the cross-section of the shaft part 130 may be larger than a diameter of a cross-section of the head part 140.

As described above, the cross-section of the shaft part 130 includes a pair of curves facing each other and a pair of straight lines facing each other. This can be explained by the shape of the outer circumference of the shaft part 130.

That is, in the illustrated embodiment, the shaft part 130 includes a curved portion 131 and a flat portion 132.

The curved portion 131 defines a portion of the outer circumference of the shaft part 130. As described above, the shaft part 130 has a pillar shape as a whole, and the curved portion 131 may be said to form a portion of a side surface of the shaft part 130.

The curved portion 131 may be provided in plurality. The plurality of curved portions 131 may be disposed to face each other. In the illustrated embodiment, two curved portions 131 are provided, forming a left outer circumference and a right outer circumference of the shaft part 130, respectively.

The curved portions 131 are continuous with the flat portion 132. That is, each end portion of the curved portions 131 in an outer circumferential direction of the shaft part 130 may be continuous with the flat portion 132.

The flat portion 132 defines the remaining portion of the outer circumference of the shaft part 130. As described above, the flat portion 132 may be said to define the remaining portion of the side surface of the shaft part 130.

The flat portion 132 may be provided in plurality. The plurality of flat portions 132 may be disposed to face each other. In the illustrated embodiment, two flat portions 132 are provided, forming a front outer circumference and a rear outer circumference of the shaft part 130, respectively.

When the shaft 100 and the bush member 400 are coupled to each other, the flat portions 132 may be disposed to face an inner circumferential surface surrounding a boss hollow portion 423 of the bush member 400. In one embodiment, the flat portion 132 may come into contact with the inner circumferential surface. In the embodiment, the flat portion 132 may be formed to be parallel to the inner circumferential surface.

Therefore, when the shaft 100 is rotated, the flat portion 132 and the inner circumferential surface are brought into contact with each other so that the bush member 400 and the shaft 100 can be rotated integrally.

In the embodiment, the flat portion 132 may be formed parallel to a boss flat portion 422 of the bush member 400.

The head part 140 is continuously formed on one side of the shaft part 130 opposite to the first extension portion 121, namely, an upper side in the illustrated embodiment.

The head part 140 is coupled to the fastening member 200. Specifically, the head part 140 is coupled through a hollow portion (reference numeral not given) formed inside the fastening member 200.

The head part 140 may extend in one direction. In the illustrated embodiment, the head part 140 extends in a direction opposite to the first extension portion 121, that is, toward the upper side.

The head part 140 has a predetermined cross-section. In the illustrated embodiment, the head part 140 has a circular cross-section. At this time, a diameter of a cross-section of the head part 140 may be smaller than the diameters of the cross-sections of the body part 110, the extension part 120, and the shaft part 130.

However, as illustrated in FIG. 10, the diameter of the cross-section of the head part 140 may be the same as a distance between the flat portions 132 of the shaft part 130.

Although not illustrated, a screw thread may be formed on an outer circumferential surface of the head part 140. In the embodiment, a screw thread may also be formed on an inner circumferential surface of the fastening member 200, so that the head part 140 and the fastening member 200 can be screwed together.

The fastening member 200 is coupled to the head part 140 to rotatably support the gear member 300, the bush member 400, and the cover member 500 coupled through the shaft 100. The fastening member 200 suppresses the gear member 300, the bush member 400, and the cover member 500 from being arbitrarily separated in a longitudinal direction of the shaft 100, that is, upward in the illustrated embodiment.

A hollow portion is formed through the fastening member 200. The head part 140 may be coupled through the hollow portion. At this time, a member made of an insulating material such as rubber may be provided on an inner circumferential surface of the fastening member 200 surrounding the hollow portion.

This can suppress an electrical connection between the shaft 100 and the fastening member 200.

The fastening member 200 may be provided in any shape capable of being coupled with the head part 140. As described above, in the embodiment in which the screw thread is formed on the outer circumference of the head part 140, a screw thread may also be formed on the inner circumferential surface of the fastening member 200. In the embodiment, the head part 140 and the fastening member 200 may be screwed together.

(2) Description of Gear Member 300

Referring to FIGS. 11 to 14, the motor assembly 60 according to the embodiment includes the gear member 300.

The gear member 300 is coupled to the shaft 100 and rotates together with the shaft 100. As described above, the shaft 100 is coupled to the motor 61 to rotate together. Accordingly, it can be said that the gear member 300 rotates together with the motor 61.

The gear member 300 may be coupled to the shaft 100. Specifically, the gear member 300 is coupled through the shaft 100 via the bush member 400. That is, a boss part 420 of the bush member 400 is coupled through a hollow part 330 of the gear member 300.

In addition, the boss part 420 of the bush member 400 is coupled through the shaft part 130 of the shaft 100. Therefore, the gear member 300 and the shaft 100 do not come into direct contact with each other.

The gear member 300 may be formed of a material having high rigidity. This is to prevent damage of the gear member 300 due to physical impact or the like which is applied in the process of transmitting the rotation of the motor 61 and the shaft 100 to the gear assembly 51. In one embodiment, the gear member 300 may be formed of a steel material.

The gear member 300 may be covered by the cover member 500. That is, in the illustrated embodiment, a first surface 311 forming an upper surface of the gear member 300 is not exposed to the outside by being covered by the cover member 500.

The gear member 300 may be covered by the bush member 400. That is, in the illustrated embodiment, a second surface 312 forming a lower surface of the gear member 300 is not exposed to the outside by being covered by a base 410 of the bush member 400.

Therefore, the gear member 300 is not exposed to the outside except for a tooth part 320 that is engaged with the gear assembly 51. As will be described later, since the bush member 400 and the cover member 500 are formed of an insulating material, the gear member 300 is insulated from the shaft 100 or the gear assembly 51.

That is, the gear member 300 may be electrically spaced apart from the motor 61 and other components.

In the illustrated embodiment, the gear member 300 includes an annular part 310, a tooth part 320, a hollow part 330, and a stepped part 340.

The tooth part 310 defines the body of the gear member 300. As can be seen from the name, a space is defined inside the annular part 310. The space may be defined as the hollow part 330.

The annular part 310 is formed to have a cross-section of an annular shape. In addition, the annular part 310 extends in the direction in which the shaft 100 extends, that is, in the vertical direction in the illustrated embodiment. In other words, the annular part 310 is formed in a pipe shape with a hollow inside.

A height of the annular part 310, that is, a length in the vertical direction, may be equal to or less than a height of the boss part 420 of the bush member 400. This is because the gear member 300 is coupled through the bush member 400.

In the illustrated embodiment, the annular part 310 includes a first surface 311 and a second surface 312.

The first surface 311 may be defined as one surface of the annular part 310, namely, an upper surface in the illustrated embodiment. The cover member 500 is seated on the first surface 311.

The second surface 312 may be defined as another surface of the annular part 310, namely, a lower surface in the illustrated embodiment. The second surface 312 is seated on a seating surface 411 of the base 410 of the bush member 400.

The tooth part 320 is formed on an outer circumference of the annular part 310, that is, on a side surface.

The tooth part 320 is a portion where the gear member 300 is engaged with the gear assembly 51. The tooth part 320 includes a plurality of concave portions and convex portions. The concave portions and the convex portions may be alternately disposed along an outer circumference of the tooth part 320.

In other words, the tooth part 320 is formed such that portions rounded radially outward and portions rounded radially inward are alternately formed along the outer circumference of the tooth part 320.

The hollow part 330 is a space through which the boss part 420 of the bush member 400 is coupled. The hollow part 330 may be defined as a space formed through the inside of the annular part 310.

The hollow part 330 extends in a height direction of the annular part 310, namely, in the vertical direction in the illustrated embodiment.

The hollow part 330 may be formed as a space with a size that varies along the height direction of the annular part 310. Accordingly, the hollow part 330 may be divided into a first hollow portion 331 as a space defined adjacent to the first surface 311, and a second hollow portion 332 as a space defined adjacent to the second surface 312.

The first hollow portion 331 of the hollow part 330 may be defined as a space formed adjacent to the cover member 500. In other words, the first hollow portion 331 defines an upper side of the hollow part 330.

The boss part 420 of the bush member 400 is partially coupled through the first hollow portion 331.

The first hollow portion 331 has a predetermined cross-section. In the illustrated embodiment, the first hollow portion 331 is formed by being surrounded by a pair of flat surfaces facing each other, and a pair of curved surfaces continuous with the pair of flat surfaces and facing each other.

The shape of the first hollow portion 331 is formed by the stepped part 340 formed on an inner circumference of the annular part 310. That is, it will be understood that the pair of flat portions are surfaces of the stepped part 340.

As will be described below, the stepped part 340 extends in the height direction of the annular part 310, that is, in the vertical direction, and its lower end portion is spaced apart from the second surface 312. That is, an extension length of the stepped part 340 is shorter than the height of the annular part 310.

Accordingly, a cross-sectional area of the first hollow portion 331 is reduced by the stepped part 340. Therefore, the cross-sectional area of the first hollow portion 331 is smaller than the cross-sectional area of the second hollow portion 332 formed in a portion where the stepped part 340 is not present.

The first hollow portion 331 extends by a predetermined length in the direction in which the annular part 310 extends, namely, in the vertical direction in the illustrated embodiment. In one embodiment, the first hollow portion 331 may extend by an extension length of the stepped part 340.

The second hollow portion 332 of the hollow part 330 may be defined as a space formed adjacent to the base 410 of the bush member 400. In other words, the second hollow portion 332 defines a lower side of the hollow part 330.

The boss part 420 of the bush member 400 is partially coupled through the second hollow portion 332.

The second hollow portion 332 has a predetermined cross-section. In the illustrated embodiment, the second hollow portion 332 has a circular cross-section.

As described above, an upper end portion of the stepped part 340 is located adjacent to the first surface 311, but a lower end portion thereof is spaced apart from the second surface 312. That is, the second hollow portion 332 may be defined as a space where the stepped part 340 is not present.

Therefore, the cross-sectional area of the second hollow portion 332 is larger than that of the first hollow portion 331.

The second hollow portion 332 extends by a predetermined length in the direction in which the annular part 310 extends, namely, in the vertical direction in the illustrated embodiment. In one embodiment, the second hollow portion 332 may extend by a height of a portion where the stepped part 340 is not present on the inner circumferential surface of the annular part 310.

In the illustrated embodiment, an extension length of the stepped part 340 is equal to or more than half of the height of the annular part 310, so it is understood that the height of the second hollow portion 332 is lower than the height of the first hollow portion 331.

The stepped part 340 is located on the inner circumference of the annular part 310 to support the boss part 420 of the bush member 400 coupled through the hollow part 330. Due to the stepped part 340, the gear member 300 can be rotated together with the bush member 400 without rotating in vain relative to the bush member 400.

The stepped part 340 extends radially inward from the inner circumference of the annular part 310. In the illustrated embodiment, a surface of the stepped part 340 facing radially inward, that is, an inner surface is formed to be flat. In addition, a surface of the stepped part 340 facing radially outward, that is, an outer surface is formed to be curved.

The inner surface of the stepped part 340 faces the boss flat portion 422 of the boss part 420 of the bush member 400. In one embodiment, the inner surface of the stepped part 340 may be in contact with the boss flat portion 422.

Accordingly, it will be understood that the shape of the inner surface of the stepped part 340 varies depending on the shape of the flat boss portion 422.

The stepped part 340 extends in a height direction of the housing 310, namely, in the vertical direction in the illustrated embodiment.

At this time, one end portion of the stepped part 340 facing the first surface 311, namely, an upper end portion in the illustrated embodiment may be located on the same plane as the first surface 311. In addition, another end portion of the stepped part 340 facing the second surface 312, namely, a lower end portion in the illustrated embodiment may be spaced apart from the second surface 312.

At this time, the another end portion of the stepped part 340 may be seated on a stepped jaw (reference numeral not given) formed on a lower side of the boss flat portion 422 of the boss part 420.

The stepped part 340 may be provided in plurality. In the illustrated embodiment, the stepped part 340 may be configured by two portions, including a first stepped portion 341 and a second stepped portion 342 which are located on a front side and a rear side of the inner circumference of the annular part 310, respectively.

The first stepped portion 341 and the second stepped portion 342 face each other with the first hollow portion 331 interposed therebetween. Surfaces of the first stepped portion 341 and the second stepped portion 342 that face each other may be formed in parallel.

At this time, it may be understood that the first step portion 341 located on the front side faces the boss flat portion 322 located at the front side and the second step portion 342 located on the rear side faces the boss flat portion 422 located at the rear side.

(3) Description of Bush Member 400

Referring to FIGS. 15 to 19, the motor assembly 60 according to the embodiment includes the bush member 400.

The bush member 400 is coupled to the shaft 100 and the gear member 300. Specifically, the bush member 400 is coupled through the gear member 300. The shaft 100 is coupled through the bush member 400. That is, the gear member 300 is coupled to the shaft 100 via the bush member 400.

By the coupling, the bush member 400 may allow the shaft 100 and the gear member 300 from being spaced apart physically and electrically. Therefore, the shaft 100 and the gear member 300 can be insulated from each other, and an arbitrary electrical connection therebetween can be suppressed.

The bush member 400 may be formed of an insulating material. This is to insulate the shaft 100 and the gear member 300 from each other to prevent the shaft 100 and the gear member 300 from being arbitrarily electrically connected to each other.

The bush member 400 may be formed of a material having high rigidity. This is to prevent damage of the bush member 400 due to rotational force generated when the bush member 400 rotates together with the shaft 100 and the gear member 300. This is also to stably transmit the rotation of the motor 100 to the gear member 300.

In one embodiment, the bush member 400 may be formed of a synthetic resin material such as reinforced plastic, a rubber material, or a ceramic material.

The bush member 400 is coupled to the shaft part 130 of the shaft 100. Specifically, the shaft part 130 is coupled through the boss hollow portion 423 formed inside the bush member 400.

The bush member 400 is coupled to the gear member 300. Specifically, the boss part 420 of the bush member 400 is coupled through the hollow part 330 formed inside the gear portion 300.

The bush member 400 rotates together with the shaft 100. Accordingly, it can be said that the bush member 400 rotates together with the motor 61. Therefore, the gear member 300 may also rotate together with the bush member 400.

The bush member 400 may cover a frame (reference numeral not given) to which the motor 61 is coupled. In the illustrated embodiment, the base 410 of the bush member 400 covers an upper side of the frame (reference numeral not given).

The bush member 400 may be surrounded by the bush member 300. In the illustrated embodiment, the boss part 420 of the bush member 400 is surrounded by the gear member 300.

The bush member 400 may be covered by the cover member 500. In the illustrated embodiment, an upper surface of the boss part 420 of the bush member 400 is covered by the cover member 500.

In the illustrated embodiment, the bush member 400 includes a base 410 and a boss part 420.

The base 410 may define one side of the bush member 400, namely, a lower side in the illustrated embodiment. The base 410 is formed to have a large cross-sectional area to support the boss part 420 from the lower side.

The base 410 has a predetermined cross-section. In addition, the base 410 is formed in a plate shape having a predetermined thickness. In the illustrated embodiment, the base 410 is formed in a disk shape having a circular cross-section and a thickness in the vertical direction.

A diameter of a cross-section of the base 410 may be larger than a diameter of a cross-section of the boss part 420. In addition, the diameter of the cross-section of the base 410 may be larger than the diameter of the cross-section of the hollow part 330 and the gear member 300.

Accordingly, the base 410 can stably support the gear member 300 through which the boss part 420 is coupled.

In the illustrated embodiment, the base 410 includes a seating surface 411, a bush stepped portion 412 and a coupling protrusion 413.

The seating surface 411 forms one surface of the base 410 facing the boss part 420, namely, an upper surface in the illustrated embodiment. The second surface 312 of the gear member 300 is adjacent to the seating surface 411.

At this time, the gear member 300 may be seated on the seating surface 411. That is, the gear member 300 may rotate together with the bush member 400 while being supported on the seating surface 411.

The bush stepped portion 412 is disposed on an he outer circumference of the seating surface 411.

The bush stepped portion 412 protrudes in a direction toward the boss part 420 to surround the outer circumference of the seating surface 411. That is, a height of the bush stepped portion 412 is higher than that of the seating surface 411.

Therefore, the outer circumference of the gear member 300 seated on the seating surface 411 is partially surrounded by the bush stepped portion 412. That is, the bush stepped portion 412 functions as a guide that supports the gear member 300 from a radially outside.

As a result, even if vibration occurs as the circuit breaker 1 is operated, the gear member 300 is not arbitrarily separated from the seating surface 411.

Furthermore, since the coupled state between the gear member 300 and the bush member 400 can be stably maintained by the bush stepped portion 412, the rotation of the gear member 300 according to the operation of the motor 61 can be reliably carried out.

In the illustrated embodiment, the bush stepped portion 412 is located at a radially outside of the boss part 420. In addition, the bush stepped portion 412 extends along an outer circumference of the seating surface 411.

The coupling protrusion 413 is located adjacent to a frame (reference numeral not given) to which the bush member 400 and the motor 61 are coupled. The coupling protrusion 413 maintains an insulated state between the motor 61 and the gear member 300 coupled to the bush member 400.

The coupling protrusion 413 is formed on another surface of the base 410 opposite to the seating surface 411, namely, on a lower surface in the illustrated embodiment. The coupling protrusion 413 protrudes downward from the another surface of the base 410, that is, the lower surface.

The coupling protrusion 413 has a predetermined cross-section. In the illustrated embodiment, the cross-section of the coupling protrusion 413 is formed in an annular shape with a diameter smaller than that of the base 410 and disposed with the same central axis.

A through hole is formed inside the coupling protrusion 413. The through hole communicates with the boss hollow portion 423. The shaft part 130 of the shaft 100 may be inserted into the boss hollow portion 423 through the through hole.

The coupling protrusion 413 has a predetermined thickness. The coupling protrusion 412 prevents the lower surface of the base 410 from being in direct contact with the frame (reference numeral not given) surrounding the motor 61.

The boss part 420 is a portion where the bush member 400 is coupled to the gear member 300. In addition, the boss part 420 includes therein a hollow portion to which the shaft part 130 of the shaft 100 is coupled. That is, the boss part 420 mediates the coupling between the gear member 300 and the shaft 100.

As described above, the boss part 420 is coupled to each of the gear member 300 and the shaft 100. Specifically, the gear member 300 is coupled to the boss part 420 while surrounding the boss part 420 from the radially outside. In addition, the boss part 420 is coupled to the shaft 100 while surrounding the shaft 100 from the radially outside.

The boss part 420 is continuous with the base 410. Specifically, the boss part 420 is continuous with the seating surface 411 of the base 410. The boss part 420 extends in a direction opposite to the seating surface 411, namely, upward in the illustrated embodiment.

The boss part 420 has a predetermined cross-section. In the illustrated embodiment, the boss part 420 has a circular cross-section, and has an annular cross-section through which the hollow boss portion 423 is formed.

At this time, an outer diameter of the cross-section of the boss part 420 may be smaller than an outer diameter of the bush stepped portion 412. In other words, the outer diameter of the cross-section of the boss part 420 is located radially inside the bush stepped portion 412.

In addition, the outer diameter of the cross-section of the boss part 420 may be equal to or smaller than that of hollow part 330 of the gear member 300. Thus, the boss part 420 can be stably inserted into the hollow part 330.

Also, in the embodiment, a center of the cross-section of the boss part 420 may be disposed on the same axis as a center of the cross-section of the seating surface 411 or the bush stepped portion 412. That is, the cross-section of the boss part 420 and the cross-section of the base 410 have the same central axis.

The boss part 420 extends by a predetermined length in a direction opposite to the base 410, namely, upward in the illustrated embodiment. In one embodiment, an extension length of the boss part 420 may be the same as the height of the gear member 300, that is, the height in the vertical direction.

In the embodiment, when the gear member 300 is coupled to the boss part 420, the boss part 420 is inserted through the hollow part 330 of the gear member 300 so as not to be exposed to the outside.

That is, in the embodiment, the first surface 311 of the gear member 300 may be disposed on the same plane as the upper surface of the boss part 420. Similarly, the second surface 312 of the gear member 300 may be in contact with the seating surface 411.

In another embodiment, the boss part 420 may extend to be longer than the height of the gear member 300. In the embodiment, an upper end portion of the boss part 420 may be exposed to the upper side of the gear member 300 so as to be coupled to the cover member 500.

The boss part 420 is coupled through the hollow part 330 of the gear member 300. As described above, the hollow part 330 includes the first hollow portion 331 and a second hollow portion 332 having different shapes from each other. Accordingly, the boss part 420 may also have a shape that varies along the extending direction to correspond to the first hollow portion 331 and the second hollow portion 332.

In one embodiment, an end portion of the boss part 420 in the extending direction, namely, an upper end portion in the illustrated embodiment may be coupled to the cover member 500. That is, the upper end portion of the boss part 420 may be inserted into a second cover hollow portion 552 of the cover member 500.

In the illustrated embodiment, the boss part 420 includes a boss curved portion 421, a boss flat portion 422, and a boss hollow portion 423.

The boss curved portion 421 defines a portion of an outer circumference of the boss part 420. As described above, the boss part 420 has a pillar shape extending in the vertical direction, and the boss curved portion 421 may be said to form a portion of a side surface of the boss part 420.

The boss curved portion 421 may be provided in plurality. The plurality of boss curved portions 421 may be disposed to face each other. In the illustrated embodiment, two boss curved portions 421 are provided, forming a left outer circumference and a right outer circumference of the boss part 420, respectively.

When the boss part 420 is inserted into the hollow part 330 of the gear member 300, the boss curved portion 421 is disposed to face a curved portion of an inner surface surrounding the hollow part 330.

The boss curved portion 421 is continuous with the flat portion 422. That is, each end portion of the boss curved portion 421 along the outer circumferential direction of the boss part 420 may be continuous with the boss flat portion 422.

The boss flat portion 422 defines the remaining portion of the outer circumference of the boss part 420. As described above, the boss flat portion 422 may be said to define the remaining portion of the side surface of the shaft part 420.

The boss flat portion 422 may be provided in plurality. The plurality of boss flat portions 422 may be disposed to face each other. In the illustrated embodiment, two boss flat portions 422 are provided, forming a front outer circumference and a rear outer circumference of the boss part 420, respectively.

The boss flat portion 422 may extend by a predetermined length in the direction in which the boss part 420 extends, namely, in the vertical direction in the illustrated embodiment. In this case, an extension length of the boss flat portion 422 in the vertical direction is shorter than an extension length of the boss curved portion 421 in the vertical direction. In one embodiment, the extension length of the boss flat portion 422 may be the same as the extension length of the stepped part 340 of the gear member 300.

In the illustrated embodiment, a lower end portion of the boss flat portion 422 is spaced apart from the seating surface 411 by a predetermined distance.

Thus, a curved surface having the same curvature as the boss curved portion 421 is formed between the lower end portion of the boss flat portion 422 and the seating surface 411. It will be understood that the shape results from that the lower end portion of the stepped part 340 of the gear member 300 is spaced apart from the second surface 312 in the vertical direction.

When the boss part 420 is inserted into the hollow part 330 of the gear member 300, the boss flat portion 422 is disposed to face the stepped part 340 on the inner surface surrounding the hollow part 330. In one embodiment, the boss flat portion 422 may come into contact with the stepped part 340. In the embodiment, the boss flat portion 422 may be formed parallel to a radially inner surface of the stepped part 340.

Accordingly, when the bush member 400 is rotated, the boss flat portion 422 and the inner surface of the stepped part 340 may be brought into contact with each other, so that the gear member 300 and the bush member 400 can be rotated integrally.

In the embodiment in which the upper end portion of the boss part 420 is coupled to the cover member 500, the boss curved portion 421 may be disposed to face a second cover inner circumferential portion 542 of the cover member 500.

In the embodiment, the boss curved portion 421 and the second cover inner circumferential portion 542 may have the same curvature and the same central angle.

Similarly, in the embodiment in which the upper end portion of the boss part 420 is coupled to the cover member 500, the boss flat portion 422 may be disposed to face a third cover inner circumferential portion 543 of the cover member 500.

In the embodiment, the boss flat portion 422 and the third cover inner circumferential portion 543 may be disposed in parallel.

The boss hollow portion 423 is formed through the inside of the boss part 420.

The boss hollow portion 423 is a space through which the shaft part 130 of the bush member 100 is coupled. The boss hollow portion 423 extends in the extending direction of the boss part 420, namely, in the vertical direction in the illustrated embodiment.

The boss hollow portion 423 has a predetermined cross-section. As described above, the shaft part 130 includes a plurality of curved portions 131 and a plurality of flat portions 132. Accordingly, the boss hollow portion 423 may also be formed by being surrounded by a pair of flat surfaces facing each other and a pair of curved surfaces facing each other. In the embodiment, the pair of flat surfaces and the pair of curved surfaces are continuous with each other.

That is, the cross-section of the boss hollow portion 423 may be formed in a shape corresponding to that of the shaft part 130.

The boss hollow portion 423 extends by a predetermined length. In the illustrated embodiment, the boss hollow portion 423 extends through the base 410 and the boss part 420. In the embodiment, the extension length of the boss hollow portion 423 may be shorter than the extension length of the shaft part 130.

That is, the upper end portion of the shaft part 130 may be exposed upward through the boss hollow portion 423. The cover member 500 is coupled to the exposed upper end portion.

(4) Description of Cover Member 500

Referring to FIGS. 20 to 24, the motor assembly 60 according to the embodiment includes the cover chamber 500.

The cover member 500 may be coupled to the shaft 100. Specifically, the cover member 500 is coupled through the head part 140 of the shaft 100. At this time, one side of the cover member 500, namely, a lower side in the illustrated embodiment covers the gear member 300 and the bush member 400. In addition, another side of the cover member 500, namely, an upper side in the illustrated embodiment is covered by the fastening member 200.

By the coupling of the cover member 500, the gear member 300 and the bush member 400, particularly, the gear member 300 is physically and electrically spaced apart from the fastening member 200. Therefore, the gear member 300 and the fastening member 200 can be insulated from each other, and an arbitrary electrical connection therebetween can be suppressed.

The cover member 500 may be formed of an insulating material. This is to insulate the gear member 300 and the fastening member 200 from each other to prevent the gear member 300 and the fastening member 200 from being arbitrarily electrically connected to each other.

The cover member 500 may be formed of a material having high rigidity. This is to prevent the cover member 500 from being damaged due to rotational force and friction, which result from the rotation of the shaft 100, the gear member 300, and the bush member 400.

In one embodiment, the cover member 500 may be formed of a synthetic resin material such as reinforced plastic, a rubber material, or a ceramic material.

The cover member 500 is coupled to the shaft part 130 and the head portion of the shaft 100. Specifically, a part of the upper side and the head portion of the shaft part 130 are coupled through the cover hollow part 550 formed inside the cover member 500.

In one embodiment, the cover member 500 may be coupled to the bush member 400. That is, in an embodiment in which the boss part 420 of the bush member 400 extends longer than the height of the gear member 300, the upper end portion of the boss part 420 may be inserted into the cover hollow part 550 of the cover member 500.

The cover member 500 rotates together with the shaft 100. Accordingly, it can be said that the cover member 500 rotates together with the motor 61. Therefore, the shaft 100, the fastening member 200, the gear member 300, the bush member 400, and the cover member 500 can rotate all together.

In the illustrated embodiment, the cover member 500 includes a cover body part 510, a first insulating part 520, a second insulating part 530, a cover inner circumferential part 540, and a cover hollow part 550.

The cover body 510 defines the body of the cover member 500. In the illustrated embodiment, the cover body 510 is located at a central portion of the cover member 500 in a thickness direction, that is, in the vertical direction.

The cover body part 510 has a predetermined cross-section. In addition, the cover body part 510 is formed in a plate shape having a predetermined thickness. In the illustrated embodiment, the cover body part 510 is formed in a disk shape that has a circular cross-section and a thickness in the vertical direction.

A diameter of a cross-section of the cover body part 510 may be larger than a diameter of a cross-section of the first insulating part 520 and a diameter of a cross-section of the second insulating part 530. In the embodiment, a center of the cross-section of the cover body part 510 may be disposed on the same axis as centers of the cross-sections of the gearing member 300 and the bush member 400.

In addition, the diameter of the cross-section of the cover body part 510 may be larger than an outer diameter of the gear member 300. Therefore, when the cover member 500 is coupled to the shaft 100, the gear member 300 may be completely covered by the cover member 500.

The cover body part 510 is continuous with the first insulating part 520 and the second insulating part 530. In the illustrated embodiment, the first insulating part 520 is continuous with the cover body part 510 on an upper side of the cover body part 510. In addition, the second insulating part 530 is continuous with the cover body 510 on a lower side of the cover body part 510.

That is, the first insulating part 520 and the second insulating part 530 face each other with the cover body part 510 interposed therebetween.

The cover hollow part 550 is formed through the inside of the cover body part 510. In addition, the inner circumferential part 540 of the cover hollow part 550 may be defined as a portion of an inner circumference of the cover body part 510.

The first insulating part 520 is located on one side of the cover body part 510, namely, on an upper side in the illustrated embodiment. The first insulating part 520 is disposed to face the second insulating part 530 with the cover body part 510 interposed therebetween.

The first insulating part 520 is continuous with the cover body part 510. The fastening member 200 is seated on the first insulating part 520.

The first insulating part 520 may have a predetermined cross-section. In the illustrated embodiment, the first insulating part 520 has an annular cross-section through which the cover hollow part 550 is formed.

An outer diameter of the cross-section of the first insulating part 520 is smaller than an outer diameter of the cross-section of the cover body part 510. In addition, the outer diameter of the cross-section of the first insulating part 520 is equal to or larger than the outer diameter of the cross-section of the second insulating part 530.

The first insulating part 520 may have a predetermined thickness. In the illustrated embodiment, the first insulating part 520 has a thickness in a thickness direction of the cover body part 510, that is, in the vertical direction, but the thickness is thinner than a thickness of the cover body part 510.

The second insulating part 530 is located on another side of the cover body part 510, namely, on a lower side in the illustrated embodiment. The second insulating part 530 is disposed to face the first insulating part 520 with the cover body part 510 interposed therebetween.

The second insulating part 530 is continuous with the cover body part 510. The second insulating part 530 is seated on the gear member 300 and the bush member 400.

The second insulating part 530 may have a predetermined cross-section. In the illustrated embodiment, the second insulating part 530 has an annular cross-section through which the cover hollow part 550 is formed.

An outer diameter of the cross-section of the second insulating part 530 is smaller than an outer diameter of the cross-section of the cover body part 510. In addition, the outer diameter of the cross-section of the second insulating part 530 is equal to or smaller than the outer diameter of the cross-section of the second insulating part 530.

The second insulating part 530 may have a predetermined thickness. In the illustrated embodiment, the second insulating part 530 has a thickness in the thickness direction of the cover body part 510, that is, in the vertical direction, but the thickness is thinner than the thickness of the cover body part 510.

Each inner circumferential surface, surrounding the cover hollow part 550 formed inside the cover body part 510, the first insulating part 520, and the second insulating part 530 may be defined as a cover inner circumferential part 540.

The cover inner circumferential part 540 is a surface surrounding the cover hollow part 550 formed through the inside of the cover member 500. The cover inner circumferential part 540 is formed on the cover body part 510, the first insulating part 520 and the second insulating part 530.

As best illustrated in FIG. 23, the cover inner circumferential part 540 includes a first cover inner circumferential portion 541, a second cover inner circumferential portion 542, and a third cover inner circumferential portion 543.

The first cover inner circumferential portion 541 defines an inner circumference of the first insulating part 520. The first cover inner circumferential portion 541 surrounds a first cover hollow portion 551 of the cover hollow part 550.

In the illustrated embodiment, the first cover hollow portion 551 is formed in a cylindrical shape that has a circular cross-section and extends in the vertical direction. Accordingly, the first cover inner circumferential portion 541 may be defined as a side surface surrounding the first cover hollow portion 551 having the cylindrical shape.

The first cover inner circumferential portion 541 is continuous with the second cover inner circumferential portion 542.

The second cover inner circumferential portion 542 forms a portion of the inner circumference of the cover body part 510 and the second insulating part 530. The second cover inner circumferential portion 542 partially surrounds a second cover hollow portion 552 of the cover hollow part 550.

At this time, in the second cover hollow portion 552, one pair of circumferences facing each other are rounded, and another pair of circumferences facing each other are formed flat. The second cover inner circumferential portion 542 forms the one pair of circumferences.

That is, the second cover inner circumferential portion 542 may be defined as a pair of curved surfaces disposed to face each other with the second cover hollow portion 552 interposed therebetween.

At this time, the shape of the second cover inner circumferential portion 542 may be formed to correspond to the shape of the curved portion 131 of the shaft part 130. That is, curvature and central angle of the second cover inner circumferential portion 542 may be the same as the curvature and central angle of the curved portion 131.

In addition, in an embodiment in which the bush member 400 is coupled to the cover member 500, it will be understood that the shape of the second cover inner circumferential portion 542 may be formed to correspond to the shape of the boss curved portion 421.

The second cover inner circumferential portion 542 is formed to have a predetermined height. In the illustrated embodiment, the second cover inner circumferential portion 542 extends by the height of the cover body part 510 and the second insulating part 530.

The second cover inner circumferential portion 542 is continuous with the third cover inner circumferential portion 543.

The third cover inner circumferential portion 543 forms a remaining portion of the inner circumference of the cover body part 510 and the second insulating part 530. The third cover inner circumferential portion 543 partially surrounds the second cover hollow portion 552 of the cover hollow part 550.

As described above, in the second cover hollow portion 552, one pair of circumferences facing each other are rounded, and another pair of circumferences facing each other are formed flat. The third cover inner circumferential portion 543 forms the another pair of circumferences.

That is, the third cover inner circumferential portion 543 may be defined as a pair of flat surfaces disposed to face each other with the second cover hollow portion 552 interposed therebetween.

At this time, the shape of the third cover inner circumferential portion 543 may be formed to correspond to the shape of the flat portion 131 of the shaft part 130.

In addition, in an embodiment in which the bush member 400 is coupled to the cover member 500, it will be understood that the shape of the third cover inner circumferential portion 543 may be formed to correspond to the shape of the boss flat portion 422.

The third cover inner circumferential portion 543 is formed to have a predetermined height. In the illustrated embodiment, the third cover inner circumferential portion 543 extends by the height of the cover body part 510 and the second insulating part 530. That is, the third cover inner circumferential portion 543 forms the remaining portion of the inner circumference of the cover body part 510 and the second insulating part 530.

Accordingly, when the shaft 100 and the cover member 500 are coupled, the head part 140 is surrounded by the first cover inner circumferential portion 541. In addition, the curved portion 131 of the shaft part 130 is located adjacent to the second cover inner circumferential portion 542, and the flat portion 132 of the shaft part 130 is located adjacent to the third cover inner circumferential portion 543.

A space surrounded by the inner circumferential part 540 may be defined as the cover hollow part 550.

The cover hollow part 550 is a space through which the shaft part 130 and the head part 140 are inserted. The cover hollow part 550 is formed through the inside of the cover body part 510, the first insulating part 520, and the second insulating part 530. The cover hollow part 550 extends in the height direction of the cover member 500, namely, in the vertical direction in the illustrated embodiment.

The cover hollow part 550 may be partitioned into a plurality of spaces. In the illustrated embodiment, the cover hollow part 550 includes a first cover hollow portion 551 located at a relatively upper side and a second cover hollow portion 552 located at a relatively lower side.

The first cover hollow portion 551 is a space through which the head part 140 of the shaft 100 is inserted. The head part 140 is inserted through the first cover hollow portion 551 so that one side in the extending direction, namely, an upper end portion is exposed to the outside of the cover member 500. The fastening member 200 may be fastened to the upper end portion of the head part 140.

The first cover hollow portion 551 is formed inside the first insulating part 520. The first cover hollow portion 551 extends in the thickness direction of the first insulating part 520, namely, in the vertical direction in the illustrated embodiment.

The first cover hollow portion 551 has a predetermined cross-section. In the illustrated embodiment, the first cover hollow portion 551 has a circular cross-section. In the embodiment, a center of the cross-section of the first cover hollow portion 551 may be located on the same axis as the center of the cross-section of the first insulating part 520.

It will be understood that the shape of the first cover hollow portion 551 is determined to correspond to the shape of the first cover inner circumferential portion 541.

In this case, a diameter of the first cover hollow portion 551 may be smaller than a minimum inner diameter of the second cover hollow portion 552. This results from that the diameter of the cross-section of the head part 140 inserted into the first cover hollow portion 551 is smaller than the diameter of the cross-section of the shaft part 130 inserted into the second cover hollow portion 552 or the diameter of the cross-section of the boss part 420.

The first cover hollow portion 551 communicates with the second cover hollow portion 552.

The second cover hollow portion 552 is a space through which the shaft part 130 of the shaft 100 is inserted. The shaft part 130 may be inserted through the second cover hollow portion 552 via the boss hollow portion 423 of the bush member 400.

In one embodiment, the boss part 420 of the bush member 400 may be partially inserted into the second cover hollow portion 552. Even in the embodiment, since the shaft part 130 is inserted through the boss part 420, it can be said that both the shaft part 130 and the boss part 420 are coupled to the second cover hollow portion 552.

The second cover hollow portion 552 is formed inside the cover body part 510 and the second insulating part 530. The second cover hollow portion 552 extends in the thickness direction of the second insulating part 530, namely, in the vertical direction in the illustrated embodiment.

The second cover hollow portion 552 has a predetermined cross-section. In the illustrated embodiment, the second cover hollow portion 552 is rounded radially outward, and is defined by being surrounded by one pair of curved surfaces facing each other and another pair of flat surfaces parallel to each other and facing each other.

It will be understood that the shape of the second cover hollow portion 552 is determined to correspond to the shape of the second cover inner circumferential portion 542 and the third cover inner circumferential portion 543.

In this case, an inner diameter of the second cover hollow portion 552 may be larger than an inner diameter of the first cover hollow portion 551. This is because the diameter of the cross-section of the shaft part 130 inserted into the second cover hollow portion 552 in each direction or the diameter of the cross-section of the boss part 420 is larger than the diameter of the cross-section of the head part 140 inserted into the first cover hollow portion 551.

In the motor assembly 60 according to the embodiment of the present disclosure, the shaft 100 and the gear member 300 are coupled to each other with the bush member 400 interposed therebetween. The bush member 400 is formed of an insulating material to prevent any electrical connection between the shaft 100 and the gear member 300.

In addition, the cover member 500 is disposed between the gear member 300 and the fastening member 200. The cover member 500 is formed of an insulating material and is disposed to cover the gear member 300. This can also prevent arbitrary electrical connection between the gear member 300 and the fastening member 200.

At the same time, due to the structure and coupling relationship of each component described above, therefore, when the motor 61 is operated and the shaft 100 is rotated, the gear member 300, the bush member 400 and the cover member 500 can be rotated together.

Furthermore, since insulating performance of the gear member 300 is guaranteed by the bush member 400 and the cover member 500, the gear member 300 can be formed of a material having high rigidity regardless of a conductivity level.

Thus, the rotation of the gear member 300 by the operation of the motor assembly 60 can be reliably transmitted to the mechanism 50. Eventually, operational reliability of the circuit breaker 1 can be improved Although it has been described above with reference to the preferred embodiments of the present disclosure, it will be understood that those skilled in the art are able to variously modify and change the present disclosure without departing from the scope of the invention described in the claims below.

DESCRIPTION OF REFERENCE NUMERALS

1: Circuit breaker
10: Distribution box
20: Circuit breaker body
30: Terminal part
31: Bus bar terminal
32: Load terminal
40: Cart part
50: Mechanism
51: Gear assembly
52: Handle
53: Camshaft
54: Top plate
55: Side plate
60: Motor assembly
61: Motor
100: Shaft
110: Body part
120: Extension part
121: First extension portion
122: Second extension portion
130: Shaft
131: Curved portion
132: Flat portion
140: Head part
200: Fastening member
300: Gear member
310: Annular part
311: First surface
312: Second surface
320: Tooth part
330: Hollow part
331: First hollow portion
332: Second hollow portion
340: Stepped part
341: First stepped portion
342: Second stepped portion
400: Bush member
410: Base
411: Seating surface
412: Bush stepped portion
413: Coupling protrusion
420: Boss part
421: Boss curved portion
422: Boss flat portion
423: Boss hollow portion
500: Cover member
510: Cover body part
520: First insulating part
530: Second insulating part
540: Cover inner circumferential part
541: First cover inner circumferential portion
542: Second cover inner circumferential portion
543: Third cover inner circumferential portion
550: Cover hollow part
551: First cover hollow portion
552: Second cover hollow portion
1000: Motor assembly according to the related art
1100: Motor according to the related art
1200: Motor gear according to the related art
1300: Gear part according to the related art

The invention claimed is:

1. A motor assembly comprising:

a motor electrically connected to an external control power source;

a shaft connected to the motor to be rotated together with the motor;

a bush member through which the shaft is coupled; and a gear member through which the bush member is coupled, and with which an external gear assembly is engaged, wherein the bush member is formed of an insulating material and is located between the shaft and the gear member in a radial direction, wherein the bush member comprises:

a base formed in a plate shape having a predetermined thickness and supporting the gear member, wherein a diameter of a cross-section of the base is larger than an outer diameter of a cross-section of the gear member; and a boss part continuously formed with the base, extending in one direction, and coupled through an inside of the gear member.

2. The motor assembly of claim 1, wherein the gear member comprises:

an annular part extending in the one direction and having a hollow therein; and a tooth part extending along an outer circumference of the annular part, and including a plurality of concave portions and convex portions, wherein the base comprises:

a seating surface supporting the gear member; and a bush stepped portion extending along an outer circumference of the seating surface and protruding from the seating surface to surround the tooth part from a radially outside of the tooth part.

3. The motor assembly of claim 1, wherein the gear member has a hollow part formed through an inside thereof in the one direction, and wherein the hollow part has a stepped part protruding radially inward from an inner circumferential surface of the gear member to partially surround the hollow part.

4. The motor assembly of claim 3, wherein the stepped part extends toward the base from one side opposite to the base, and an end portion of the stepped part facing the base is spaced apart from the base, and wherein the hollow part comprises:

a first hollow portion having a first portion surrounded by the stepped part; and a second hollow portion communicating with the first hollow portion, and located between the end portion of the stepped part and the base to have a larger space than the first hollow portion.

5. The motor assembly of claim 4, wherein the stepped part is provided as part of a plurality of stepped parts facing each other, and surfaces of the plurality of stepped parts facing each other are formed flat, and wherein the boss part of the bush member comprises:

a plurality of flat portions forming a first portion of an outer circumference thereof, disposed to face the plurality of stepped parts, and spaced apart to face each other; and a plurality of curved portions continuous with the plurality of flat portions, disposed to face an inner circumference surrounding a remaining portion of the first hollow portion and an inner circumference surrounding the second hollow portion, and spaced apart to face each other.

6. The motor assembly of claim 1, wherein the shaft includes a shaft part extending in the one direction and coupled through the bush member, wherein the shaft part comprises:

a curved portion defining a first portion of an outer circumference thereof and rounded radially outward; and a flat portion defining a remaining portion of the outer circumference, continuous with the curved portion, and formed flat, wherein the bush member comprises a boss hollow portion formed through an inside thereof in the one direction such that the shaft part is coupled therethrough.

7. The motor assembly of claim 6, wherein an inner circumference of the bush member surrounding the boss hollow portion has:

a first portion facing the curved portion and rounded to be radially outwardly convex; and a second portion facing the flat portion and formed flat.

8. The motor assembly of claim 1, further comprising:

a fastening member coupled to an end portion of the shaft in one direction in which the shaft extends; and a cover member through which the shaft is coupled, and which is located between the fastening member and the gear member to cover the gear member, wherein the cover member is formed of an insulating material.

9. The motor assembly of claim 8, wherein the shaft comprises:

a shaft part extending in the one direction, coupled through the bush member, and partially inserted into the cover member; and a head part continuous with the shaft part, and inserted through the cover member such that one end portion thereof is coupled to the fastening member.

10. The motor assembly of claim 9, wherein the shaft part comprises:

a curved portion defining a first portion of an outer circumference thereof and rounded radially outward; and a flat portion defining a remaining portion of the outer circumference, continuous with the curved portion, and formed flat, wherein the cover member comprises:

a first cover hollow portion formed through an inside thereof such that the head part is inserted therethrough; and a second cover hollow portion which communicates with the first cover hollow portion and into which the shaft part is partially inserted, wherein the second cover hollow portion is formed such that a diameter of a cross-section thereof is larger than a diameter of a cross-section of the first cover hollow portion.

11. The motor assembly of claim 10, wherein the cover member comprises:

a first cover inner circumferential portion surrounding the first cover hollow portion;

a second cover inner circumferential portion surrounding a first portion of the second cover hollow portion; and a third cover inner circumferential portion continuous with the second cover inner circumferential portion, and surrounding a remaining portion of the second cover hollow portion, wherein the second cover inner circumferential portion faces the curved portion and is rounded to be convex radially outwardly, and wherein the third cover inner circumferential portion faces the flat portion and is formed flat.

12. A circuit breaker comprising:

a circuit breaker body disposed to form an electrical connection between an external power source and a load;

a mechanism accommodated inside the circuit breaker body and allowing or blocking the electrical connection; and a motor assembly engaged with a gear assembly of the mechanism and operated by an external control power source, wherein the motor assembly comprises:

a motor electrically connected to the external power source;

a shaft coupled to the motor to be rotated together with the motor, and extending in one direction;

a gear member through which the shaft is coupled to be rotated together;

a bush member through which the shaft is coupled and which is coupled through the gear member, so as to be located between the shaft and the gear member and rotated together with the shaft; and a cover member located to face the motor with the gear member and the bush member interposed therebetween, and rotated together with the shaft that is coupled therethrough, wherein the bush member and the cover member are formed of an insulating material.

13. The circuit breaker of claim 12, wherein an outer diameter of a cross-section of the gear member is smaller than an outer diameter of each cross-section of the bush member and the cover member, and wherein end portions of the gear member in the one direction are covered by the bush member and the cover member, respectively.

14. The circuit breaker of claim 12, further comprising a fastening member coupled to an end portion of the shaft in the one direction, and wherein the cover member is located between the gear member and the fastening member and supports the fastening member.

15. A motor assembly comprising:

a motor electrically connected to an external control power source;

a shaft connected to the motor to be rotated together with the motor;

a bush member through which the shaft is coupled; and a gear member through which the bush member is coupled, and with which an external gear assembly is engaged, a fastening member coupled to an end portion of the shaft in one direction in which the shaft extends; and a cover member through which the shaft is coupled, and which is located between the fastening member and the gear member to cover the gear member, wherein the cover member is formed of an insulating material, wherein the shaft comprises:

a shaft part extending in the one direction, coupled through the bush member, and partially inserted into the cover member; and a head part continuous with the shaft part, and inserted through the cover member such that one end portion thereof is coupled to the fastening member; and wherein the bush member is formed of an insulating material and is located between the shaft and the gear member in a radial direction.

* * * * *